(12) United States Patent
Li

(10) Patent No.: US 10,869,304 B2
(45) Date of Patent: Dec. 15, 2020

(54) DOWNLINK CONTROL INFORMATION SENDING METHOD, DOWNLINK CONTROL INFORMATION DETECTION METHOD, AND DEVICE

(71) Applicant: Huawei Technologies Co., Ltd., Shenzhen (CN)

(72) Inventor: Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 16/189,718

(22) Filed: Nov. 13, 2018

(65) Prior Publication Data
US 2019/0082430 A1    Mar. 14, 2019

Related U.S. Application Data

(63) Continuation of application No. PCT/CN2016/082056, filed on May 13, 2016.

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/0038* (2013.01); *H04L 1/0061* (2013.01);
(Continued)

(58) Field of Classification Search
None
See application file for complete search history.

(56) References Cited

U.S. PATENT DOCUMENTS

2010/0279628 A1* 11/2010 Love .................. H04L 5/003
455/70
2013/0114529 A1   5/2013 Chen et al.
(Continued)

FOREIGN PATENT DOCUMENTS

CN    101478808 A    7/2009
CN    102355340 A    2/2012
(Continued)

OTHER PUBLICATIONS

"PDCCH design for short TTI," 3GPP TSG RAN WG1 Meeting #84bis, Busan, Korea, R1-162109, pp. 1-4, 3rd Generation Partnership Project, Valbonne, France (Apr. 11-15, 2016).
(Continued)

*Primary Examiner* — Diane L Lo
(74) *Attorney, Agent, or Firm* — Leydig, Voit & Mayer, Ltd.

(57) ABSTRACT

A downlink control information sending method, a downlink control information detection method, and a device are provided. The method includes: receiving, by a terminal device, first signaling, where the first signaling includes configuration information of search space; determining, by the terminal device based on the configuration information, a frequency domain resource or a CCE resource occupied by the search space; and detecting, by the terminal device, downlink control information in the search space. A network device may configure the search space to occupy any frequency domain resource or CCE resource. The terminal device determines, based on the first signaling, the search space configured by the network device, and obtains the downlink control information in a timely manner. This effectively improves data transmission efficiency, and in particular, resolves a problem that downlink control infor-
(Continued)

mation of duration less than 1 ms cannot be obtained in a timely manner.

12 Claims, 7 Drawing Sheets

(51) Int. Cl.
*H04W 48/16* (2009.01)
*H04L 1/00* (2006.01)

(52) U.S. Cl.
CPC .......... *H04L 5/0053* (2013.01); *H04W 48/16* (2013.01); *H04W 72/04* (2013.01); *H04W 72/0446* (2013.01); *H04L 5/0007* (2013.01)

(56) References Cited

U.S. PATENT DOCUMENTS

| | | | |
|---|---|---|---|
| 2013/0114563 A1* | 5/2013 | Oizumi | H04L 5/001 370/329 |
| 2013/0262444 A1 | 10/2013 | Leslie et al. | |
| 2014/0071911 A1* | 3/2014 | Horiuchi | H04L 5/0053 370/329 |
| 2014/0247816 A1 | 9/2014 | Kim et al. | |
| 2015/0117336 A1* | 4/2015 | Huss | H04W 72/042 370/329 |
| 2015/0117354 A1 | 4/2015 | Dai et al. | |
| 2015/0189628 A1 | 7/2015 | Pan et al. | |
| 2015/0237604 A1 | 8/2015 | Shi et al. | |
| 2015/0289079 A1 | 10/2015 | Webb et al. | |
| 2016/0323859 A1 | 11/2016 | Liu et al. | |
| 2019/0124627 A1* | 4/2019 | Park | H04L 5/0053 |

FOREIGN PATENT DOCUMENTS

| | | |
|---|---|---|
| CN | 102547738 A | 7/2012 |
| CN | 103200684 A | 7/2013 |
| CN | 103391563 A | 11/2013 |
| CN | 104054290 A | 9/2014 |
| JP | 2015526974 A | 9/2015 |
| JP | 2016508317 A | 3/2016 |

OTHER PUBLICATIONS

"Downlink control channels for shortened TTI," 3GPP TSG RAN WG1 Meeting #84bis, Busan, Korea, R1-162405, pp. 1-7, 3rd Generation Partnership Project, Valbonne, France (Apr. 11-15, 2016).
"Design of DL channels for shortened TTI," 3GPP TSG RAN WG1 Meeting #84b, Busan, Korea, R1-162738, pp. 1-5, 3rd Generation Partnership Project, Valbonne, France (Apr. 11-15, 2016).
"DL channel designs for shortened TTI," 3GPP TSG RAN WG1 Meeting #84bis, Busan, Korea, R1-163171, pp. 1-7, 3rd Generation Partnership Project, Valbonne, France (Apr. 11-15, 2016).
"Physical layer aspects for PDCCH for short TTI," 3GPP TSG RAN WG1 Meeting #84 bis, Busan, R1-163319, pp. 1-3, 3rd Generation Partnership Project, Valbonne, France (Apr. 11-15, 2016).
"Link evaluation for PDCCH for short TTI," 3GPP TSG RAN WG1 Meeting #84 bis, Busan, R1-163315, pp. 1-6, 3rd Generation Partnership Project, Valbonne, France (Apr. 11-15, 2016).
"Reference signal for sPDCCH demodulation," 3GPP TSG RAN WG1 Meeting #84bis, Busan, Korea, R1-162504, pp. 1-9, 3rd Generation Partnership Project, Valbonne, France (Apr. 11-15, 2016).
"Time/Frequency resource of sPDCCH and sPDSCH," 3GPP TSG RAN WG1 Meeting #84bis, Busan, Korea, R1-162506, pp. 1-9, 3rd Generation Partnership Project, Valbonne, France (Apr. 11-15, 2016).
CN/201680085442.8, Office Action, dated Mar. 26, 2020.

\* cited by examiner

DOWNLINK CONTROL INFORMATION SENDING METHOD, DOWNLINK CONTROL INFORMATION DETECTION METHOD, AND DEVICE

CROSS-REFERENCE TO RELATED APPLICATIONS

This application is a continuation of International Application No. PCT/CN2016/082056, filed on May 13, 2016, the disclosure of which is hereby incorporated by reference in its entirety.

TECHNICAL FIELD

Embodiments of the present invention relate to communications technologies, and in particular, to a downlink control information sending method, a downlink control information detection method, and a device.

BACKGROUND

In a Long Term Evolution (LTE) system, before receiving downlink data or sending uplink data, a terminal device needs to know scheduling information configured by a network device for the terminal device, for example, time-frequency resource allocation and a modulation and coding scheme. In addition, the network device needs to notify the terminal device of power control command information related to uplink transmission. The scheduling information and the power control command information are collectively referred to as downlink control information (DCI), and the DCI is used for scheduling data transmission.

A current specific DCI transmission implementation is: The network device mainly uses a physical downlink control channel (PDCCH) to carry the DCI, and sends the DCI to the terminal device, and the terminal device needs to detect and obtain the DCI on one or more PDCCHs in search space. Therefore, the terminal device needs to determine the search space. The search space is a set of PDCCHs to be detected by the terminal device. Current search space all includes PDCCHs configured to schedule data transmission of 1 ms, and is located on first one, two, three, or four symbols of a downlink subframe, or is located in a symbol area of a physical downlink shared channel (PDSCH), and an occupied channel resource is relatively fixed. Therefore, the current search space is not flexible in data transmission of duration less than 1 ms, causing relatively low transmission efficiency.

SUMMARY

Embodiments of the present invention provide a downlink control information sending method, a downlink control information detection method, and a device, to resolve a problem that current search space is not flexible in data transmission of duration less than 1 ms, causing relatively low transmission efficiency.

A first aspect of the present invention provides a downlink control information detection method, and the solution is applied to a terminal device on a user side. The method includes:

receiving, by a terminal device, first signaling, where the first signaling includes configuration information of search space;

determining, by the terminal device based on the configuration information of the search space, a frequency domain resource or a control channel element (CCE) resource occupied by the search space; and detecting, by the terminal device, downlink control information in the search space.

In this solution, actually, the first signaling may indicate the frequency domain resource or the CCE resource occupied by the search space. A network device may configure the search space to occupy any frequency domain resource or CCE resource. The terminal device determines, based on the first signaling, the search space configured by the network device, and obtains the downlink control information in a timely manner. This effectively improves data transmission efficiency, and in particular, resolves a problem that downlink control information of duration less than 1 ms cannot be obtained in a timely manner.

In specific implementation, before the detecting, by the terminal device, downlink control information in the search space, the method further includes:

determining, by the terminal device, a control channel area, where the search space is located in the control channel area.

In a specific implementation solution, the first signaling indicates an aggregation level L and a search space startpoint identifier Y, and the determining, by the terminal device based on the configuration information, a frequency domain resource or a CCE resource occupied by the search space includes:

determining, by the terminal device based on first signaling, that the search space includes a CCE whose number is $L*\{(Y+m) \bmod \lfloor N_{CCE}/L \rfloor\}+i$, where $i=0, \ldots, L-1$, $m=0, \ldots, M^{(L)}-1$, $M^{(L)}$ is a quantity of candidate downlink control channels included in search space whose aggregation level is L, and $N_{CCE}$ represents a total quantity of available CCEs in a transmission time interval occupied by the search space.

In another specific implementation solution, before the determining, by the terminal device, a control channel area, the method further includes:

receiving, by the terminal device, second signaling, where the second signaling indicates a resource occupied by the control channel area, the second signaling includes $N_{CCEG}$ information fields, an $i^{th}$ information field in the $N_{CCEG}$ information fields indicates that H CCEs in a control channel element group (CCEG) i−1 are configured for the control channel area, i is a positive integer not greater than $N_{CCEG}$, and the CCEG i−1 includes G CCEs, G is a positive integer, and H is a nonnegative integer not greater than G.

In this solution, preferably, G is equal to 8, H is 0, 2, 4, or 8, and a quantity of bits in the $i^{th}$ information field is 2.

Further, the configuration information of the search space indicates that the search space is located on a CCEG j, or the configuration information of the search space indicates that a startpoint of the search space is a CCEG j, and j is a nonnegative integer less than $N_{CCEG}$.

In another specific implementation solution, the first signaling further includes configuration information of the control channel area, where the configuration information of the search space indicates that a startpoint of the search space is a CCE i, and the configuration information of the control channel area indicates that the control channel area occupies X consecutive CCEs, X is a positive integer, and i is a nonnegative integer less than X.

The determining, by the terminal device, a control channel area includes:

determining, by the terminal device, the control channel area based on the configuration information of the control channel area.

In another specific implementation solution, the first signaling further includes configuration information of the control channel area, where the configuration information of the control channel area indicates that the control channel area occupies E consecutive CCEGs, and the configuration information of the search space indicates that a startpoint of the search space is a CCEG i, E is a positive integer, and i is a nonnegative integer less than E.

The determining, by the terminal device, a control channel area includes:

determining, by the terminal device, the control channel area based on the configuration information of the control channel area.

Before the determining, by the terminal device, a control channel area, the method further includes:

receiving, by the terminal device, third signaling, where the third signaling indicates that the control channel area occupies N short resource blocks, each short resource block occupies 12 subcarriers in frequency domain, and occupies one or two symbols in time domain, and N can be exactly divided by 3 or 4.

The determining, by the terminal device, a control channel area includes:

determining, by the terminal device, the control channel area based on the third signaling.

In another specific implementation solution, before the determining, by the terminal device, a control channel area, the method further includes:

receiving, by the terminal device, fourth signaling, where the fourth signaling indicates that the control channel area occupies M consecutive virtual short resource blocks, and M is a positive integer that can be exactly divided by 3 or 4.

The determining, by the terminal device, a control channel area includes:

determining, by the terminal device based on the fourth signaling and a mapping relationship between a virtual short resource block and a physical short resource block, M inconsecutive physical short resource blocks occupied by the control channel area, where the mapping relationship between a virtual short resource block and a physical short resource block indicates that the M consecutive virtual short resource blocks are corresponding to the M inconsecutive physical short resource blocks.

In another specific implementation solution, before the determining, by the terminal device, a control channel area, the method includes:

receiving, by the terminal device, fifth signaling, where the fifth signaling indicates that the control channel area occupies Z consecutive CCEs, and Z is a positive integer.

The determining, by the terminal device, a control channel area includes:

determining, by the terminal device, the control channel area based on the fifth signaling.

A second aspect of the present invention provides a downlink control information sending method, including:

sending, by a network device, a first instruction, where the first signaling includes configuration information of search space, and the configuration information is used to indicate a frequency domain resource or a control channel element CCE resource; and sending, by the network device, downlink control information in the search space.

In a specific implementation solution, before the sending, by a network device, first signaling, the method further includes:

determining, by the network device, a control channel area, where the search space is located in the control channel area.

In a specific implementation solution, the first signaling specifically indicates an aggregation level of the search space and an identifier of the terminal device.

In a specific implementation solution, the configuration information of the search space indicates an aggregation level L and a search space startpoint identifier Y, and before the sending, by a network device, first signaling, the method further includes:

determining, by the network device, that the search space includes a CCE whose number is $L*\{(Y+m) \bmod \lfloor N_{CCE}/L \rfloor\}+i$, where $i=0, \ldots, L-1$, $m=0, \ldots, M^{(L)}-1$, $M^{(L)}$ is a quantity of candidate downlink control channels included in search space whose aggregation level is L, and $N_{CCE}$ represents a total quantity of available CCEs in a transmission time interval occupied by the search space.

In a specific implementation solution, the method further includes:

sending, by the network device, second signaling, where the second signaling indicates a resource occupied by the control channel area, the second signaling includes $N_{CCEG}$ information fields, an $i^{th}$ information field in the $N_{CCEG}$ information fields indicates that H CCEs in a control channel element group CCEG i−1 are configured for the control channel area, i is a positive integer not greater than $N_{CCEG}$ and the CCEG i−1 includes G CCEs, G is a positive integer, and H is a nonnegative integer not greater than G.

In this solution, preferably, G is equal to 8, H is 0, 2, 4, or 8, and a quantity of bits in the $i^{th}$ information field is 2.

Further, the configuration information of the search space indicates that the search space is located on a CCEG j, or the configuration information of the search space indicates that a startpoint of the search space is a CCEG j, and j is a nonnegative integer less than $N_{CCEG}$.

In a specific implementation solution, the first signaling further includes configuration information of the control channel area, the configuration information of the control channel area indicates that the control channel area occupies E consecutive CCEGs, and the configuration information of the search space indicates that a startpoint of the search space is a CCEG i, E is a positive integer, and i is a nonnegative integer less than E.

In a specific implementation solution, before the sending, by the network device, downlink control information in the search space, the method further includes:

sending, by the network device, third signaling, where the third signaling indicates that the control channel area occupies N short resource blocks, each short resource block occupies 12 subcarriers in frequency domain, and occupies one or two symbols in time domain, and N can be exactly divided by 3 or 4.

In a specific implementation solution, before the sending, by the network device, downlink control information in the search space, the method further includes:

sending, by the network device, fourth signaling, where the fourth signaling indicates that the control channel area occupies M consecutive virtual short resource blocks, and M is a positive integer that can be exactly divided by 3 or 4; and the M consecutive virtual short resource blocks are corresponding to M inconsecutive physical short resource blocks.

In a specific implementation solution, before the sending, by the network device, downlink control information in the search space, the method further includes:

sending, by the network device, fifth signaling, where the fifth signaling indicates that the control channel area occupies Z consecutive CCEs, and Z is a positive integer.

A third aspect of the present invention provides a terminal device, including:

a receiving module, configured to receive first signaling, where the first signaling includes configuration information of search space; and a processing module, configured to determine, based on the configuration information of the search space, a frequency domain resource or a control channel element CCE resource occupied by the search space, where the processing module is further configured to detect downlink control information in the search space.

Optionally, the processing module is further configured to determine a control channel area, and the search space is located in the control channel area.

The terminal device may be implemented by using software, or the terminal device may be implemented by using a hardware device. This is not limited. The apparatus is specifically configured to implement the technical solution of each downlink control information detection method provided in the first aspect, and implementation principles of the apparatus are similar to those of the downlink control information detection method. For a specific implementation and details, refer to the first aspect.

A fourth aspect of the present invention provides a network device, including a sending module configured to send a message and a processing module configured to control instruction execution, where the processing module is configured to determine search space; and the sending module is configured to:

send a first instruction, where the first signaling includes configuration information of search space, and the configuration information is used to indicate a frequency domain resource or a control channel element CCE resource; and send downlink control information in the search space.

Optionally, the processing module is configured to determine a control channel area, and the search space is located in the control channel area.

The downlink control information sending apparatus may be implemented by using software, or the network device may be implemented by using a hardware device, or may be implemented as another control device. This is not limited. The apparatus is specifically configured to implement the technical solution of each downlink control information sending method provided in the second aspect, and implementation principles of the apparatus are similar to those of the downlink control information sending method. For a specific implementation and details, refer to the second aspect.

A fifth aspect of the present invention provides a terminal device, including a memory that stores a program instruction, a processor configured to control execution of the program instruction, a transmitter configured to send a message, and a receiver configured to receive a message, where the receiver is configured to receive first signaling, where the first signaling includes configuration information of search space; and the processor is configured to determine, based on the configuration information of the search space, a frequency domain resource or a control channel element CCE resource occupied by the search space, where the processor is further configured to detect downlink control information in the search space.

Optionally, the processor is further configured to determine a control channel area, and the search space is located in the control channel area.

The terminal device provided in this solution is specifically configured to implement the technical solution of each downlink control information detection method provided in the first aspect, and implementation principles and technical effects of the terminal device are similar to those of the downlink control information detection method. For a specific implementation and details, refer to the first aspect.

A sixth aspect of the present invention provides a network device, including a memory that stores a program instruction, a processor configured to control execution of the program instruction, and a transmitter configured to send a message, where the transmitter is configured to:

send a first instruction, where the first signaling includes configuration information of search space, and the configuration information is used to indicate a frequency domain resource or a control channel element CCE resource; and send downlink control information in the search space.

Optionally, the processor is configured to determine a control channel area, and the search space is located in the control channel area.

The network device provided in this solution is specifically configured to implement the technical solution of each downlink control information sending method provided in the second aspect, and implementation principles and technical effects of the network device are similar to those of the downlink control information sending method. For a specific implementation and details, refer to the second aspect.

According to the downlink control information sending method, the downlink control information detection method, and the device that are provided in the embodiments of the present invention, the network device may configure the search space to occupy any frequency domain resource or CCE resource. The terminal device determines, based on the first signaling, the search space configured by the network device, and obtains the downlink control information in a timely manner. This effectively improves data transmission efficiency, and in particular, resolves a problem that downlink control information of duration less than 1 ms cannot be obtained in a timely manner.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

Currently defined search space all includes PDCCHs configured to schedule data transmission of 1 ms, and is located on first one, two, three, or four symbols of a downlink subframe, or is located in a symbol area of a PDSCH (that is, last 13, 12, 11, or 10 symbols of a downlink subframe), and an occupied channel resource is relatively fixed. Therefore, a search space configuration is relatively fixed. For example, a size of the search space is fixed. This is not flexible in data transmission of duration less than 1 ms, causing relatively low transmission efficiency. This application provides a new downlink control information transmission solution, to overcome this problem.

The downlink control information transmission solution provided in this application is applied to a wireless communications system, for example, a 3rd generation mobile communication technology (3G), 4.5G, or 5G communications system. Specifically, embodiments of the present invention may be applied to a wireless communications system that includes a network device and a terminal device (or terminal equipment). For example, a terminal device and a network device communicate with each other, a terminal device and a terminal device communicate with each other, or a network device and a network device communicate with each other. The terminal device may be a device that provides a user with voice and/or data connectivity, a handheld device with a wireless connection function, or another processing device connected to a wireless modem. The wireless terminal may communicate with one or more core networks by using a radio access network (RAN). The wireless terminal may be a mobile terminal, such as a mobile phone (also referred to as a "cellular" phone) and a computer with a mobile terminal, and for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit (SU), a subscriber station (SS), a mobile station (MS), a mobile console, a remote station (RS), an access point (AP), a remote terminal (RT), an access terminal (AT), a user terminal (UT), a user agent (UA), a user device, or user equipment (UE). The network device may be a base station, an enhanced base station, a relay having a scheduling function, a device having a base station function, or the like. The base station may be an evolved NodeB (eNB or eNodeB) in an LTE system, or a base station in another system. This is not limited in the embodiments of the present invention.

Figure 1:
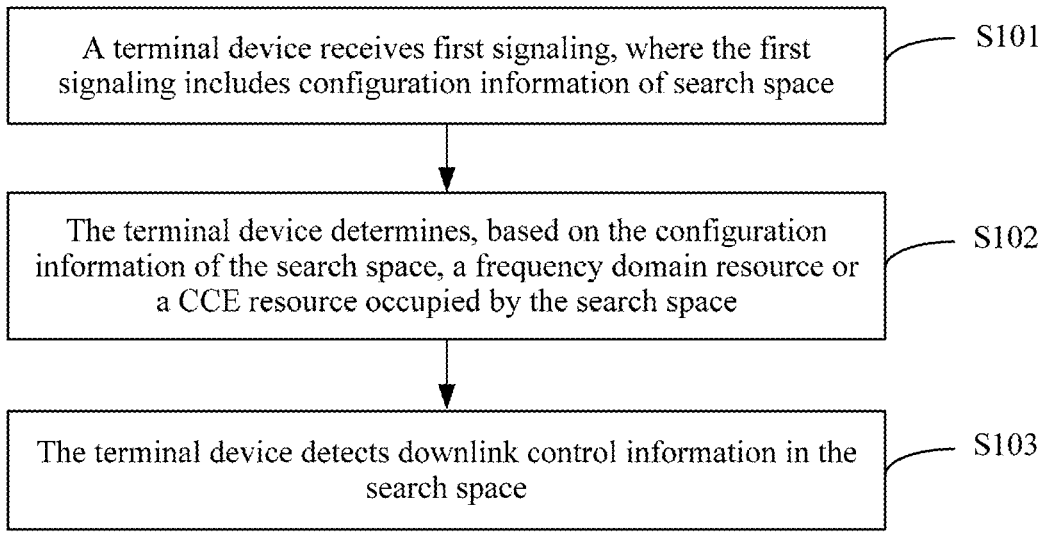
FIG. 1 is a flowchart of Embodiment 1 of a downlink control information detection method according to the present invention.

FIG. 1 is a flowchart of Embodiment 1 of a downlink control information detection method according to the present invention. As shown in FIG. 1, the downlink control information detection method is applied to a terminal device side. Specific implementation steps of the method are as follows.

S101. A terminal device receives first signaling, where the first signaling includes configuration information of search space.

In this step, a network device or another control device may flexibly configure, as required, a resource occupied by the search space, and send the configuration information of the search space to the terminal device by using the first signaling.

Optionally, the configuration information of the search space is CCE resource configuration information of the search space.

Optionally, the configuration information of the search space is frequency domain resource configuration information of the search space.

Optionally, the configuration information of the search space is frequency domain resource configuration information and time domain resource configuration information of the search space. For example, the configuration information of the search space further indicates that the search space occupies S symbols, and S is a positive integer. For example, S is 1, 2, 3, 4, 6, or 7.

The search space includes one or more candidate downlink control channels, and each candidate downlink control channel can be used to carry DCI. In short, the search space is a set of candidate downlink control channels. The terminal device needs to monitor a candidate downlink control channel, and therefore the search space is a set of candidate downlink control channels monitored by the terminal device.

S102. The terminal device determines, based on the configuration information of the search space, a frequency domain resource or a CCE resource occupied by the search space.

Optionally, the terminal device determines, based on the configuration information, the CCE resource occupied by the search space. Optionally, the terminal device determines, based on the configuration information, the frequency domain resource occupied by the search space. Optionally, the terminal device determines, based on the configuration information, the frequency domain resource and a time domain resource occupied by the search space.

In this step, the terminal device determines the search space based on a resource indicated in the received first signaling. The candidate downlink control channel in the search space is configured to transmit downlink control information.

S103. The terminal device detects downlink control information in the search space.

The terminal device detects the downlink control information in the search space. If the terminal device detects the downlink control information, the terminal device performs data transmission based on the downlink control information.

The network device or the another control device flexibly configures the search space as required. The terminal device determines the search space by using the first signaling sent by the network device or the another control device, and detects the downlink control information. In this way, the network device may configure the search space to occupy any frequency domain resource or CCE resource, so that the terminal device obtains the downlink control information in the configured search space in a timely manner, effectively improving data transmission efficiency. For example, for data transmission of duration less than 1 ms, the network device may configure the search space to occupy relatively few frequency domain resources or CCE resources, to reduce a quantity of PDCCH blind detection times for the terminal device, thereby quickly obtaining downlink control information, and improving data transmission efficiency.

In the foregoing solution, optionally, the terminal device detects the downlink control information in the search space. If the terminal device detects a candidate control channel whose cyclic redundancy check (CRC) is correct, DCI carried on the candidate control channel is DCI sent by the network device to the terminal device for scheduling data transmission. If the terminal device detects no candidate control channel whose CRC is correct, it indicates that the network device sends no DCI to the terminal device. It should be noted that the present invention imposes no limitation on how the terminal device detects DCI. For example, detecting the DCI in the search space by the terminal device may be decoding, by the terminal device, all or some of the candidate downlink control channels in the search space based on a quantity of information bits of the DCI.

Optionally, if the terminal device detects the DCI used for scheduling data transmission, the terminal device may perform data transmission with the network device based on the DCI. For downlink data transmission, the terminal device may receive, on a data transmission resource indicated in the DCI, a downlink data packet sent by the network device. For uplink data transmission, the terminal device may send an uplink data packet to the network device on a data transmission resource indicated in the DCI.

Figure 2:
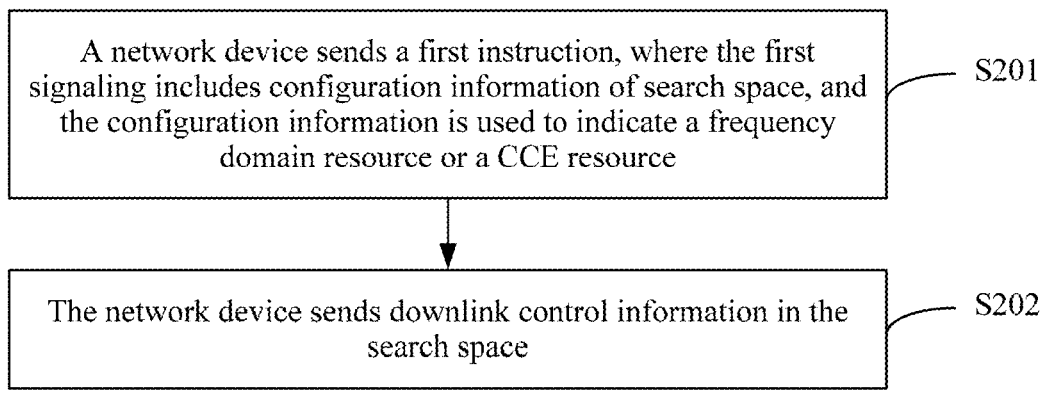
FIG. 2 is a flowchart of Embodiment 1 of a downlink control information sending method according to the present invention.

FIG. 2 is a flowchart of Embodiment 1 of a downlink control information sending method according to the present invention. As shown in FIG. 2, the downlink control information transmission method is applied to a network device side. Specific implementation steps of the method are as follows.

S201. A network device sends a first instruction, where the first signaling includes configuration information of search space, and the configuration information is used to indicate a frequency domain resource or a CCE resource.

Optionally, the configuration information of the search space is CCE resource configuration information of the search space.

Optionally, the configuration information of the search space is frequency domain resource configuration information of the search space.

Optionally, the configuration information of the search space is frequency domain resource configuration information and time domain resource configuration information of the search space.

Before the network device sends the first signaling, the method further includes: determining, by the network device, the frequency domain resource, the CCE resource, or a time-frequency resource occupied by the search space. In this solution, the network device determines (or configures) a resource of the search space as required, and sends the resource to a terminal device by using the first instruction, so that the terminal device can determine the search space based on the resource indicated in the first instruction.

S202. The network device sends downlink control information in the search space.

The network device sends the downlink control information in the determined search space, so that the terminal device can detect and obtain the downlink control information in the determined search space, and then perform data scheduling based on the downlink control information.

Optionally, before the network device sends the first signaling, the method further includes:
determining, by the network device, a control channel area, where the search space is located in the control channel area.

The network device or another control device flexibly configures the search space as required. The terminal device determines the search space by using the first instruction sent by the network device or the another control device, and detects the downlink control information. In this way, the network device may configure the search space to occupy any frequency domain resource or CCE resource, so that the terminal device obtains the downlink control information in the configured search space in a timely manner, effectively improving data transmission efficiency.

The downlink control information transmission solution provided in this application is described below by using specific instances. First, some concepts are first defined, to facilitate description of the embodiments of this application. An LTE system is used as an example for description, but it does not mean that the embodiments of the present invention are applicable to only the LTE system. Actually, the solution provided in the embodiments of the present invention can be used in any wireless communications system in which data transmission is performed through scheduling.

1. Frame Structure

In an existing LTE system, each radio frame includes 10 subframes having a length of 1 ms, and each subframe includes two timeslots. For a normal cyclic prefix (normal CP), each slot includes seven symbols, that is, each slot includes symbols numbered {#0, #1, #2, #3, #4, #5, #6}. For an extended Cyclic Prefix (extended CP), each slot includes six symbols, that is, each slot includes symbols numbered {#0, #1, #2, #3, #4, #5}. In a future evolved LTE system, a length of a subframe may be shortened to reduce latency. For example, a length of each subframe is shortened to 0.2 ms, 0.25 ms, or fewer milliseconds.

In this application, a time length of a subframe and a time length of a symbol are not limited. Without loss of generality, one subframe includes N symbols (N is a positive integer), that is, one uplink subframe includes N uplink symbols, or one downlink subframe includes N downlink symbols. The uplink symbol and the downlink symbol are referred to as symbols. The uplink symbol is referred to as a single carrier frequency division multiple access (SC-FDMA) symbol, and the downlink symbol is referred to as an orthogonal frequency division multiplexing (OFDM) symbol. It should be noted that if a new uplink multi-access mode or downlink multi-access mode is introduced in a subsequent technology, the uplink symbol and the downlink symbol may be still referred to as symbols. The uplink multi-access mode and the downlink multi-access mode are not limited in the present invention.

2. TTI

In a current solution, a TTI length is 1 ms, but a time domain resource actually occupied for data transmission is equal to or less than 1 ms. For example, first one, two, three, or four symbols of a downlink subframe may be used to transmit a PDCCH. Therefore, a time domain resource occupied for downlink data transmission whose TTI length is 1 ms may be less than 1 ms. A last symbol in an uplink subframe may be used to transmit a sounding reference signal (SRS). Therefore, a time domain resource occupied for uplink data transmission whose TTI length is 1 ms may be less than 1 ms.

A short TTI is a TTI whose TTI length is less than 1 ms, for example, 0.5 ms, or a length of one, two, three, or four symbols. Likewise, a time domain resource occupied for data transmission whose TTI length is equal to the length of the short TTI is equal to or less than the length of the short TTI. For example, for downlink data transmission whose TTI length is four symbols, if the four symbols include one, two, or three PDCCH symbols, the data transmission occupies only three, two, or one symbol.

3. RE, Short Resource Block, Short Resource Element Group, and Available Bandwidth A resource element (RE) is a minimum element in time-frequency domain, and is uniquely identified by an index pair (k, l), where k is a subcarrier index, and l is a symbol index. Certainly, the resource element may also be identified by using an identifier in another form.

In this application, a concept of a short resource block (SRB) is described. One SRB occupies $N_{sc}^{RB}$ consecutive subcarriers in frequency domain, and occupies $N_{symb}^{DL}$ symbols in time domain. $N_{sc}^{RB}$ is a positive integer, and $N_{sybm}^{DL}$ a positive integer not greater than 7. For example, $N_{sybm}^{DL}=1$ or 2, and $N_{sc}^{RB}=12$. That is, the SRB and an resource block (RB) that is in the prior art occupy a same resource in frequency domain, and use a same number.

In this application, a concept of a short resource element group (SREG) is described. One SREG occupies $N_{sc}^{RB}$ consecutive subcarriers in frequency domain, and occupies $N_{sybm}^{DL}$ symbols in time domain. $N_{sc}^{RB}$ is a positive integer, and $N_{sybm}^{DL}$ is a positive integer not greater than 7. For example, $N_{sybm}^{DL}=1$ or 2, and $N_{sc}^{RB}=12$. That is, one SREG occupies one RB in frequency domain, and occupies one or two symbols in time domain.

In this application, available bandwidth may be downlink system bandwidth, bandwidth used for short TTI downlink data transmission, or bandwidth used for control channel transmission. Short TTI downlink data transmission is downlink data transmission that occupies a time domain resource less than 1 ms, and the bandwidth used for short TTI downlink data transmission may be configured for one terminal device or one group of terminal devices. The available bandwidth may be predefined or notified by using higher layer signaling. The available bandwidth includes $N_{SRB}$ SRBs, that is, $N_{SRB}$ is a quantity of SRBs included in the available bandwidth. Optionally, the $N_{SRB}$ SRBs may be consecutively allocated or non-consecutively allocated.

4. Downlink Control Channel and Search Space

A downlink control channel is a channel used to carry DCI, that is, the DCI is carried on the downlink control channel. Optionally, a downlink control channel is formed by aggregation of L control channel elements (CCE), and L is a positive integer and referred to as an aggregation level (AL). For example, L may be 1, 2, 4, or 8. Optionally, one CCE includes C SRBs, and C is a positive integer. For example, C=3, 4, or 5. Optionally, one CCE includes $N_{CCE}$ REs, and $N_{CCE}$ is a positive integer. For example, $N_{CCE}=36$, or $N_{CCE} \leq 36$. Optionally, one CCE includes C SREGs, and C is a positive integer. For example, C=3, 4, or 5. Quantities of REs occupied by a cell-specific reference signal (CRS) on different symbols are different, and the CRS cannot carry downlink control information. Therefore, SRBs or SREGs included in CCEs on different symbols may be different, to obtain similar quantities of REs occupied by uplink/downlink control information on the different symbols. Optionally, the CCEs located on the different symbols may include different quantities of SRBs or SREGs. For example, for a normal CP, one or two CRS antenna ports are configured, a CCE located on a symbol #0 or a symbol #4 in one timeslot includes four SRBs or four SREGs, and a CCE located on a symbol #1, #2, #3, #5, or #6 in one timeslot includes three SRBs or three SREGs. For example, for a normal CP, four CRS antenna ports are configured, a CCE located on a symbol #0, a symbol #1, or a symbol #4 in one timeslot includes four SRBs or four SREGs, and a CCE located on a symbol #2, #3, #5, or #6 in one timeslot includes three SRBs or three SREGs.

Search space includes one or more candidate downlink control channels, and each candidate downlink control channel can be used to carry DCI. In short, the search space is a set of candidate downlink control channels. The terminal device needs to monitor a candidate downlink control channel, and therefore the search space is a set of candidate downlink control channels monitored by the terminal device.

Optionally, the search space is terminal device-specific search space, that is, the search space is configured for one terminal device.

Optionally, the search space is group-specific search space, that is, the search space is configured for one group of terminal devices. In specific implementation, a group identifier may be used for indication.

Optionally, a size of the search space may be determined based on Table 1. Search space of an aggregation level 1 includes three, two, or one candidate downlink control channel of an aggregation level 1. Search space of an aggregation level 2 includes three, two, or one candidate downlink control channel of an aggregation level 2. Search space of an aggregation level 4 includes two or one candidate downlink control channel of an aggregation level 4. Search space of an aggregation level 8 includes two or one candidate downlink control channel of an aggregation level 8. For example, one SRB occupies 12 consecutive subcarriers in frequency domain, and occupies one symbol in time domain, one CCE includes three SRBs, and the search space of the aggregation level 1, 2, 4, or 8 respectively includes 6, 12, 24, or 48 SRBs. For example, one CCE includes 36 REs, and the search space of the aggregation level 1, 2, 4, or 8 respectively includes 72, 144, 288, or 576 REs. The search space is terminal device-specific search space or group-specific search space.

TABLE 1

| Search Space | | Quantity $M^{(L)}$ of Candidate |
|---|---|---|
| Type | Aggregation Level L | Downlink Control Channels |
| Terminal device-specific search space | 1 | 3, 2, or 1 |
| | 2 | 3, 2, or 1 |
| | 4 | 2 or 1 |
| | 8 | 2 or 1 |

On the basis of the foregoing solution, optionally, the search space is located in a short transmission time interval (short TTI, sTTI). The sTTI occupies one symbol, two symbols, three symbols, four symbols, or 0.5 ms.

Optionally, the first signaling includes the CCE configuration information of the search space, that is, the first signaling indicates the CCE resource occupied by the search space. The sTTI has $N_{CCE}$ available CCEs, and the available CCEs are numbered from 0 to $N_{CCE}-1$. To be specific, $N_{CCE}$ represents a total quantity of available CCEs in a transmission time interval m, and the transmission time interval m is one of a plurality of transmission time intervals included in a subframe in which the search space is located. The sTTI has $N_{CCEG}$ available CCEGs, and the available CCEGs are numbered from 0 to $N_{CCEG}-1$. One CCEG includes G CCEs, and G is positive integer, for example, 1, 2, 3, 4, 8, or 16.

Optionally, the search space cannot be used for PDSCH transmission. That is, a PDSCH is not mapped to the resource occupied by the search space. Although the search space cannot be used for PDSCH transmission, the search space and the PDSCH may overlap in time domain. To avoid a resource waste, the network device may duly determine, based on current downlink control channel load, a frequency domain resource or a CCE resource occupied by the search space, and notify the terminal device of the currently used search space by using the first signaling. In this way, the terminal device can learn of, based on the first signaling, the frequency domain resource or the CCE resource occupied by the search space, and then receive downlink data on an unoccupied frequency domain resource or CCE resource, thereby reducing a resource waste. To avoid a resource waste, in the present invention, the frequency domain resource or the CCE resource indicated in the first signaling is equal to an actually used frequency domain resource or CCE resource as much as possible. In addition, the first signaling designed in the present invention features few overheads.

Before, when, or after the terminal device determines, based on the configuration information, the frequency domain resource or the CCE resource occupied by the search space in step 101 in Embodiment 1, the method further includes:

determining, by the terminal device, the control channel area.

Correspondingly, before, when, or after the network device sends the first signaling in step 201 in Embodiment 2, the method further includes:

determining, by the network device, the control channel area.

Optionally, the search space is located in the control channel area, that is, the control channel area includes the search space. In this case, the terminal device detects the downlink control information in the search space.

Optionally, some resources occupied by the search space are located in the control channel area. In this case, to reduce a quantity of blind detection times of downlink control channels, the terminal device may detect downlink control information only on some resources occupied by the search space.

Optionally, the search space is not located in the control channel area, that is, a resource occupied by the control channel area does not include the resource occupied by the search space, and it indicates that no downlink control information is sent to the terminal device, and therefore the terminal device may skip detecting the search space.

Optionally, the control channel area occupies S symbols in time domain, and S is a positive integer. For example, S is 1, 2, 3, 4, 6, or 7.

Optionally, the control channel area is located in the available bandwidth in frequency domain. It should be noted that "the control channel area is located in the available bandwidth in frequency domain" includes two cases: "a frequency domain resource occupied by the control channel area is the entire available bandwidth" and "the frequency domain resource occupied by the control channel area is less than the available bandwidth".

Optionally, the control channel area cannot be used for PDSCH transmission. That is, a PDSCH is not mapped to the control channel area. In this case, it may be considered that all or most of downlink control channels in the control channel area carry downlink control information of one or more terminal devices, and therefore cannot be used for PDSCH transmission. The PDSCH is used to carry downlink shared channel (DL-SCH) data and/or paging channel (PCH) data. In other words, the PDSCH is used to carry downlink service data or higher layer signaling. Because the control channel area cannot be used for PDSCH transmission, to avoid a resource waste, the network device may duly determine the control channel area based on current downlink control channel load, and notify the terminal device of the currently used control channel area by using signaling. In this way, the terminal device can learn of, based on the signaling, the resource occupied by the control channel area, and then receive downlink data on an unoccupied resource, thereby reducing a resource waste. To avoid a resource waste, in the present invention, the resource occupied by the control channel area indicated in the signaling is equal to an actually used resource as much as possible. For example, the network device currently needs to send four downlink control channels, and each downlink control channel needs to occupy three SRBs. In this case, the network device sends signaling to notify the terminal device that the control channel area occupies 12 SRBs.

Optionally, the terminal device determines the control channel area based on received control channel area configuration signaling, and the control channel area configuration signaling indicates the resource occupied by the control channel area. Specifically, the control channel area configuration signaling indicates a time domain resource and/or a frequency domain resource occupied by the control channel area, or second signaling indicates a CCE resource occupied by the control channel area. Correspondingly, after the network device determines the control channel area, the method further includes: sending, by the network device, the control channel area configuration signaling.

Optionally, the first signaling and/or the control channel area configuration signaling is physical layer signaling. For example, the first signaling and/or the control channel area configuration signaling are/is located in a control channel area defined in Rel-8. Optionally, the first signaling and/or the control channel area configuration signaling are/is sent by the network device to one terminal device or one group of terminal devices. When the downlink system bandwidth is less than or equal to 10 RBs (resource block), the control channel area defined in Rel-8 occupies first two, three, or four symbols of the one subframe. When the downlink system bandwidth is greater than 10 RBs, the PDCCH area defined in Rel-8 occupies first one, two, or three symbols of the one subframe.

With reference to the foregoing descriptions of the control channel area and the search space, a search space determining solution and a control channel area determining solution are separately described below. It should be noted that, in different solutions, the control channel area configuration signaling is named different signaling names, such as second signaling, third signaling, fourth signaling, fifth signaling, and sixth signaling.

A. Search Space Determining Solution

1. First Search Space Determining Solution

The configuration information in the first signaling is the CCE resource configuration information of the search space, and the configuration information indicates at least one of Y, L, and $M^{(L)}$, that is, the first signaling indicates at least one of Y, L, and $M^{(L)}$.

On the terminal device side, that the terminal device determines the search space based on the configuration information (or the first signaling) and a search space formula $L*\{(Y+m) \bmod \lfloor N_{CCE}/L \rfloor\}+i$ specifically includes:

The terminal device determines, based on the configuration information (or the first signaling), that the search space includes a CCE whose number is $L*\{(Y+m) \bmod \lfloor N_{CCE}/L \rfloor\}+i$, where $i=0, \ldots, L-1, m=0, \ldots, M^{(L)}-1$, $M^{(L)}$ is a quantity of candidate downlink control channels included in search space whose aggregation level is L, and $N_{CCE}$ represents a total quantity of available CCEs. Specifically, the search space is located in the transmission time interval m, $N_{CCE}$ represents the total quantity of available CCEs in the transmission time interval m, and the transmission time interval m is one of the plurality of transmission time intervals included in the subframe in which the search space is located.

On the network device side, the network device may send the foregoing first signaling to the terminal device, and the first signaling specifically indicates at least one of Y, L, and $M^{(L)}$ in the search space formula.

Optionally, the first signaling indicates Y and L. $M^{(L)}$ is a value indicated in Table 1, that is, the terminal device determines $M^{(L)}$ based on Table 1. In this case, the network device may configure L based on a downlink channel status of the terminal device. When the downlink channel status is good, a relatively small value of L is configured, or if the downlink channel status is poor, a relatively large value of L is configured. In addition, the terminal device obtains a value of L based on the first signaling, and performs downlink control channel blind detection only in the search space whose aggregation level is L, so that a quantity of blind detection times can be reduced. In addition, the network device may configure, as required, the search space to be located in different CCEs by adjusting Y.

Optionally, the first signaling indicates the aggregation level L of the search space. In this case, a value of Y is preset. For example, Y=0; or $Y=n_{RNTI}$, and $n_{RNTI}$ is an identifier of the terminal device; or $Y=N_{ID}^{cell}$, and $N_{ID}^{cell}$ is a cell identifier; or Y is equal to a value of Y calculated based on terminal device-specific search space defined in Rel-8.

2. Second Search Space Determining Solution

The configuration information in the first signaling is the CCE resource configuration information of the search space, that is, the first signaling indicates the CCE resource occupied by the search space, and the second signaling indicates the resource occupied by the control channel area. The second signaling includes $N_{CCEG}$ information fields, respectively indicating quantities of CCEs that are in $N_{CCEG}$ CCEGs and that are configured for the control channel area. An $i^{th}$ information field indicates that H CCEs in a CCEG i-1 are configured for the control channel area, i is a positive integer not greater than $N_{CCEG}$ and H is a nonnegative integer.

Specifically, before the terminal device determines the control channel area, the method further includes: receiving, by the terminal device, the second signaling, where the second signaling indicates the resource occupied by the control channel area, the second signaling includes the $N_{CCEG}$ information fields, the $i^{th}$ information field in the $N_{CCEG}$ information fields indicates that the H CCEs in the control channel element group CCEG i-1 are configured for the control channel area, i is a positive integer not greater than $N_{CCEG}$ and the CCEG i-1 includes G CCEs, G is a positive integer, and H is a nonnegative integer not greater than G.

Figure 3:
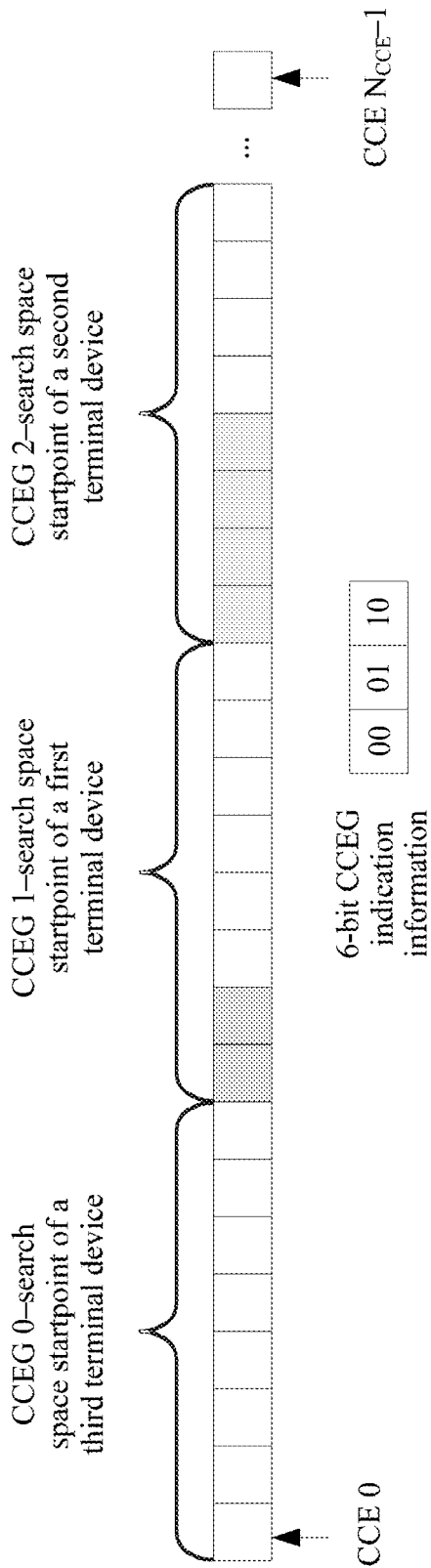
FIG. 3 is a schematic diagram of indicating search space in a second search space determining solution according to the present invention.

Optionally, G is equal to 8, and a quantity of bits in the $i^{th}$ information field is 2. This means that the CCEG i-1 includes eight CCEs, the $i^{th}$ information field includes 2-bit information, and four states of the 2-bit information respectively indicate four values of H. For example, H is 0, 2, 4, or 8. Optionally, '00' indicates 0, '01' indicates 2, '10' indicates 4, and '11' indicates 8. FIG. 3 is a schematic diagram of indicating search space in the second search space determining solution according to the present invention. As shown in FIG. 3, $N_{CCEG}=3$, and a first information field is '00', indicating that no CCE in a CCEG 0 is configured for the control channel area, a second information field is '01', indicating that two CCEs in a CCEG 1 are configured for the control channel area, and a third information field is '10', indicating that four CCEs in a CCEG 2 are configured for the control channel area. For example, H is 1, 2, 4, or 8. Optionally, '00' indicates 1, '01' indicates 2, '10' indicates 4, and '11' indicates 8.

Optionally, G is equal to 4, to be specific, one CCEG includes four CCEs. The $i^{th}$ information field includes 1-bit information, and two states of the 1-bit information respectively indicate two values of H. For example, H is 0 or 4. Optionally, '0' and '1' respectively indicate 0 and 4. For example, H is 2 or 4. Optionally, '0' and '1' respectively indicate 2 and 4.

Optionally, G is equal to 16, to be specific, one CCEG includes 16 CCEs. The $i^{th}$ information field includes 3-bit information, and eight states of the 3-bit information respectively indicate eight values of H. For example, the eight values of H are eight values of 0, 1, 2, 4, 6, 8, 10, 12, 14, and 16.

On the basis of any one of the foregoing solutions, the configuration information (or the first instruction) indicates that the search space is located on a CCEG j, or the configuration information (or the first instruction) indicates that a startpoint of the search space is a CCEG j, and j is a nonnegative integer less than $N_{CCEG}$.

Specifically, the first signaling indicates that the search space is located on the CCEG j, and j is a nonnegative integer less than $N_{CCEG}$ In this way, the search space cannot occupy a plurality of CCEGs.

Optionally, the first signaling indicates that the startpoint of the search space is the CCEG j, and j is a nonnegative integer less than $N_{CCEG}$ Specifically, the first signaling indicates a value of j, and search space whose aggregation level is L includes a CCE whose number is $$L*\left\{(j*G+m)\bmod\left[\left\lfloor\frac{N_{CCE}}{G}\right\rfloor*G/L\right]\right\}+i.$$

Figure 4:
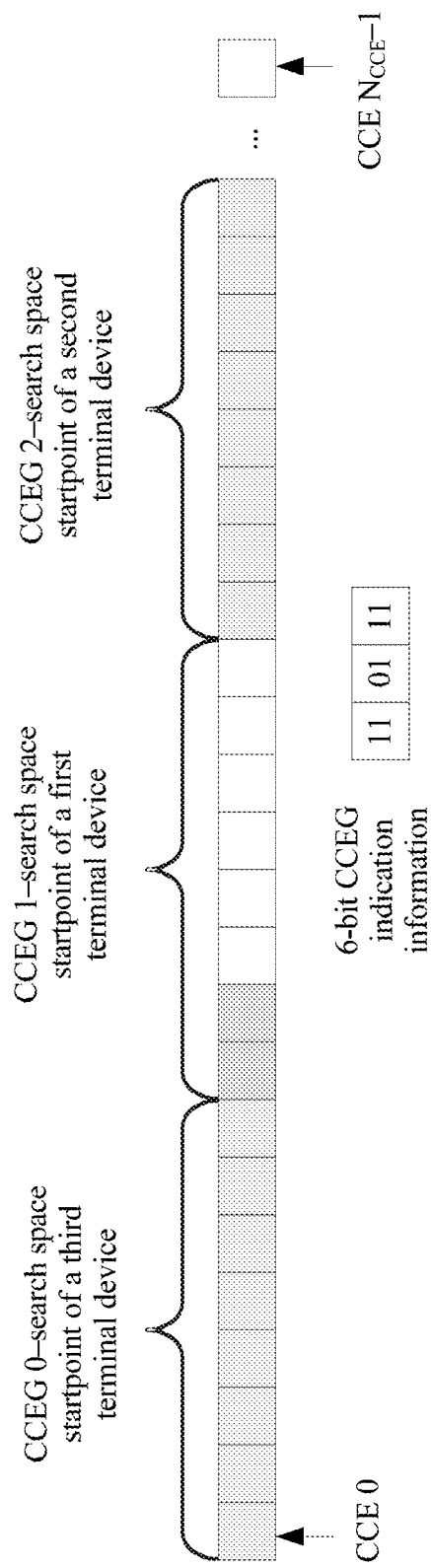
FIG. 4 is another schematic diagram of indicating search space in a second search space determining solution according to the present invention.

G is a quantity of CCEs included in one CCEG, $i=0, \ldots, L-1, m=0, \ldots, M^{(L)}-1$, and $M^{(L)}$ is a quantity of candidate downlink control channels included in the search space whose aggregation level is L. In this way, when the aggregation level of the search space is relatively large, the search space may occupy a plurality of CCEGs. When no CCE in the CCEG j indicated in the second signaling is configured for the control channel area, the search space is not configured, that is, the terminal device does not need to detect downlink control information (step 102 is skipped). For example, as shown in FIG. 3, $N_{CCEG}$=3. If the terminal device is a first terminal device, the startpoint of the search space is located on the CCEG 1; if the terminal device is a second terminal device, the startpoint of the search space is the CCEG 2; or if the terminal device is a third terminal device, the startpoint of the search space is the CCEG 0. However, FIG. 3 shows that no CCE in the CCEG 0 is currently configured for the control channel area, and therefore the third terminal device does not need to detect downlink control information. FIG. 4 is another schematic diagram of indicating search space in the second search space determining solution according to the present invention. For example, as shown in FIG. 4, $N_{CCEG}$=3. If the terminal device is a first terminal device, the startpoint of the search space is the CCEG 1; if the terminal device is a second terminal device, the startpoint of the search space is the CCEG 2, and the search space includes two candidate downlink control channels whose aggregation levels are 8, that is, the search space occupies the CCEG 2 and the CCEG 0; or if the terminal device is a third terminal device, the startpoint of the search space is the CCEG 0. However, CCEs in the CCEG 0 are allocated to the second terminal device, and therefore the third terminal device detects no downlink control information.

In the second search space determining solution, a corresponding network side device sends the second signaling, where the second signaling indicates the resource occupied by the control channel area, the second signaling includes the $N_{CCEG}$ information fields, the $i^{th}$ information field in the $N_{CCEG}$ information fields indicates that the H CCEs in the control channel element group CCEG i−1 are configured for the control channel area, i is a positive integer not greater than $N_{CCEG}$ and the CCEG i−1 includes the G CCEs, G is a positive integer, and H is a nonnegative integer not greater than G.

Optionally, G is equal to 8, and H is 0, 2, 4, or 8, or H is 1, 2, 4, or 8, and the quantity of bits in the $i^{th}$ information field is 2. For a specific implementation, refer to descriptions of the terminal device side.

3. Third Search Space Determining Solution

The first signaling includes the configuration information of the search space, and further, the first signaling further includes configuration information of the control channel area. Optionally, the configuration information of the search space and the configuration information of the control channel area are jointly indicated, that is, are located in a same information field, and are denoted as first configuration information for ease of subsequent description.

On the terminal device side, the terminal device receives the first signaling, and the first signaling includes the configuration information of the search space and the configuration information of the control channel area. The terminal device determines, based on the configuration information of the search space, the CCE resource occupied by the search space, and determines, based on the configuration information of the control channel area, the CCE resource occupied by the control channel area. That is, the terminal device determines the control channel area and the search space based on the received first signaling, the search space is located in the control channel area, and the first signaling indicates the resource occupied by the control channel area and the resource occupied by the search space. The third search space determining solution includes at least the following two methods.

First method: The first instruction indicates that the control channel area occupies X consecutive CCEs, and indicates that a startpoint of the search space is a CCE i, X is a positive integer, and i is a nonnegative integer less than X. That is, the configuration information of the search space indicates that the startpoint of the search space is the CCE i, and the configuration information of the control channel area indicates that the control channel area occupies the X consecutive CCEs.

Figure 5:
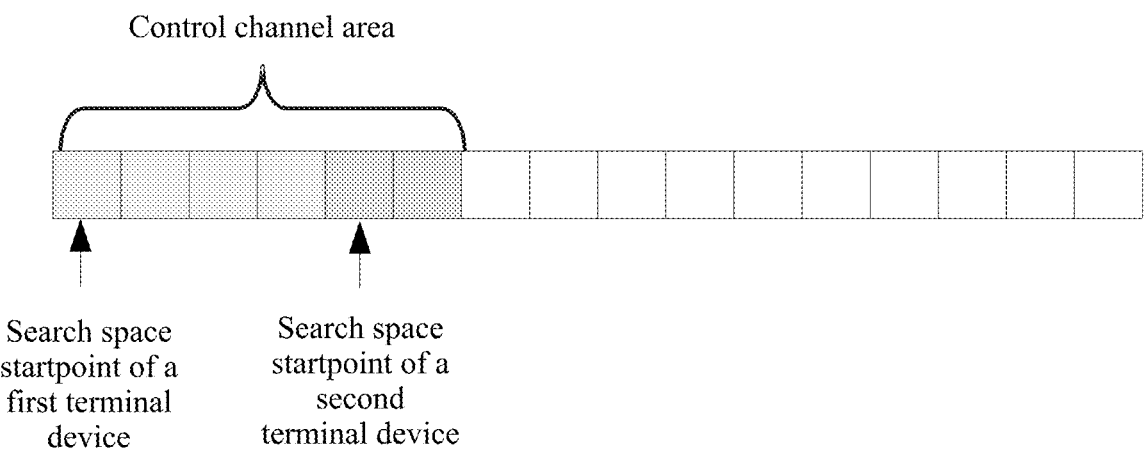
FIG. 5 is a schematic diagram of indicating search space in a third search space determining solution according to the present invention.

Specifically, the control channel area occupies the X consecutive CCEs, and a startpoint of the X CCEs is a CCE 0. The first signaling indicates a value of X and the startpoint of the search space. That is, the configuration information of the control channel area indicates the value of X, and the configuration information of the search space indicates that the startpoint of the search space is the CCE i. FIG. 5 is a schematic diagram of indicating search space in the third search space determining solution according to the present invention. For example, in FIG. 5, the first signaling indicates that X=6. For a first terminal device, the first signaling further indicates that the startpoint of the search space is the CCE 0, and for a second terminal device, the first signaling further indicates that the startpoint of the search space is a CCE 4. Optionally, the first signaling is sent to one terminal device. In this case, the first signaling includes B-bit information that indicates the value of X and the startpoint of the search space, that is, the first configuration information has B bits, and B=$\lceil \log_2(N_{CCE} (N_{CCE}+1)/2) \rceil$. For example, $N_{CCE}$=16. In this case, B=8. Optionally, the first signaling is sent to U (U is a positive integer) terminal devices. In this case, the first signaling includes B-bit information that indicates the value of X and startpoints of U pieces of search space, and B=(U+1)*$\lceil \log_2 N_{CCE} \rceil$. For example, U=2, and $N_{CCE}$=16. In this case, B=12.

In the first method, the control channel area indicated in the first signaling is a resource occupied by a downlink control channel of one or more terminal devices. By using the first signaling, the terminal device may determine an unused resource, and then receive a PDSCH by using the unused resource. In this method, few information bits are used to indicate the search space and the control channel area.

Second method: The first instruction indicates that the control channel area occupies E consecutive CCEGs, and indicates that a startpoint of the search space is a CCEG i, E is a positive integer, and i is a nonnegative integer less than E. That is, the configuration information of the search space indicates that the startpoint of the search space is the CCEG i, and the configuration information of the control channel area indicates that the control channel area occupies the E consecutive CCEGs.

Specifically, the control channel area occupies the E consecutive CCEGs, and a startpoint of the E consecutive CCEGs is a CCEG 0. The first signaling indicates a value of E, and indicates that the startpoint of the search space is the CCEG i, and i is a nonnegative integer less than E. That is, the configuration information of the control channel area indicates the value of E, and the configuration information of the search space indicates that the startpoint of the search space is the CCEG i. Optionally, the G CCEs are consecutively distributed. For example, in FIG. 5, one CCEG includes two CCEs, and the control channel area occupies three consecutive CCEGs. A search space startpoint of a first terminal device is the CCEG 0, and a search space startpoint of a second terminal device is a CCEG 2. Optionally, the G CCEs are distributed non-consecutively or at equal intervals. Using the CCEG can further reduce overheads of the first signaling compared with the first method.

Optionally, the first signaling in any one of the foregoing solutions may be sent by the network device, or may be sent by another control device. This is not limited in this application.

B. Control Channel Area Determining Solution

4. First Control Channel Area Determining Solution

Third signaling indicates that the control channel area occupies N short resource blocks SRBs or N SREGs, and N is a positive integer. Optionally, N can be exactly divided by C, and C is a positive integer. For example, C is equal to 3 or 4. For descriptions of the SRB and the SREG, refer to the foregoing descriptions.

It should be noted that an embodiment of the present invention in this solution may be applied to the first signaling and determining of the search space, while mere a change of "the third signaling" to "the configuration information of the search space included in the first signaling" and a change of "the control channel area" to "the search space" are required. For example, the configuration information of the search space indicates that the search space occupies N short resource blocks SRBs or N SREGs, and N is a positive integer. For specific content, refer to the descriptions in the solution, and details are not described herein again.

Before the terminal device determines the control channel area, the method further includes: receiving, by the terminal device, the third signaling, and then determining, by the terminal device, the control channel area based on the third signaling.

Optionally, the third signaling may be sent by the network device, and specific implementation on the network device side is: Before the network device sends the downlink control information in the search space, the network device sends the third signaling.

That the network device determines the control channel area includes: determining, by the network device, that the control channel area occupies the N short resource blocks SRBs or the N SREGs.

Specific implementation includes the following manners.

First manner: The terminal device determines that the control channel area occupies the N SRBs or the N SREGs, and N is a positive integer. Optionally, the terminal device determines, based on the received third signaling, that the control channel area occupies the N SRBs or the N SREGs. Optionally, N can be exactly divided by C, that is, N=C×a (a is a positive integer). C is a minimum quantity of SRBs occupied by one downlink physical channel, or C is a quantity of SRBs occupied by one CCE. C is a positive integer. For example, C=3 or 4. In this method, N can be exactly divided by C, so that a redundant resource indication state is avoided.

Second manner: The control channel area occupies N consecutive SRBs or N consecutive SREGs, and the third signaling indicates a startpoint and an endpoint of the N consecutive SRBs or the N consecutive SREGs. In this way, the third signaling includes B-bit information used to indicate the N consecutive SRBs or the N consecutive SREGs, where $B=\lceil\log_2(N_{SRB}(N_{SRB}+1)/2)\rceil$, and $N_{SRB}$ is a quantity of SRBs or SREGs included in the available bandwidth.

Third manner: The control channel area occupies N consecutive SRBs or N consecutive SREGs, a startpoint of the N consecutive SRBs or the N consecutive SREGs is an SRB with a smallest SRB number or an SREG with a smallest SREG number in the available bandwidth, and the third signaling indicates a value of N, or indicates an endpoint of the N consecutive SRBs or the N consecutive SREGs. In this way, the third signaling includes B-bit information used to indicate N, where $B=\lceil\log_2(N_{SRB})\rceil$.

Fourth manner: The control channel area occupies N SRBs or N SREGs, including an SRB or an SREG whose number is $(S_{SRB}+i) \bmod N_{SRB}$, $i=0, \ldots, N-1$, and the third signaling cell indicates a value of N. $S_{SRB}$ is calculated based on a cell identifier (Cell ID, $N_{ID}^{cell}$). For example, $S_{SRB}=N_{ID}^{cell}$, $S_{SRB}=N_{ID}^{cell} \bmod N_{SRB}$, or $S_{SRB}=N_{ID}^{cell} \bmod N_{SRB}+k$, and k is a positive integer. In this way, the third signaling includes B-bit information used to indicate N, where $B=\lceil\log_2(N_{SRB})\rceil$.

5. Second Control Channel Area Determining Solution

Figure 6:
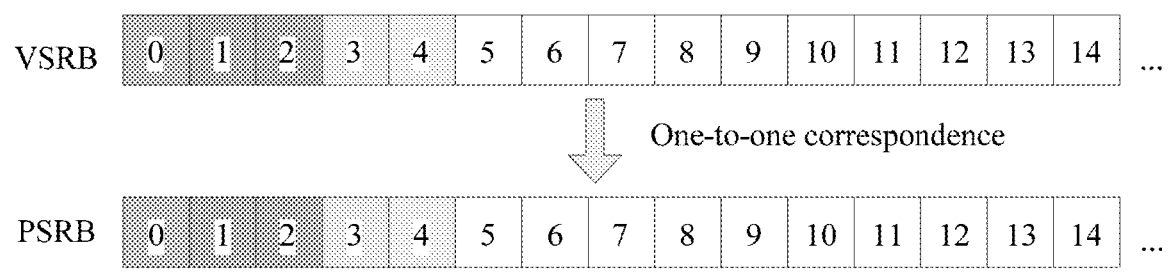
FIG. 6 is a schematic diagram of indicating a control channel area in a second control channel area determining solution according to the present invention.
Figure 7:
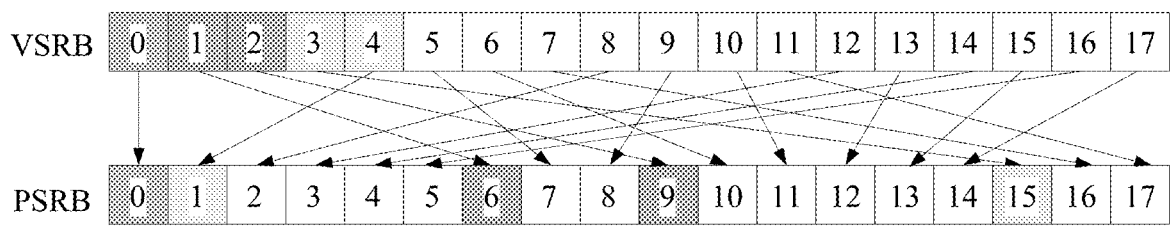
FIG. 7 is another schematic diagram of indicating a control channel area in a second control channel area determining solution according to the present invention.

The terminal device determines, based on received fourth signaling, that the control channel area occupies M virtual short resource blocks (VSRB), and the terminal device determines, based on a mapping relationship between a VSRB and a physical short resource block (PSRB), a physical short resource block PSRB occupied by the control channel area. It should be noted that sizes of the VSRB and the PSRB are the same as that of the SRB. Optionally, VSRBs and PSRBs are in a one-to-one correspondence, that is $n_{PRB}=n_{VRB}$. $n_{PRB}$ is a PSRB number, and $n_{VRB}$ is a VSRB number. FIG. 6 is a schematic diagram of indicating a control channel area in the second control channel area determining solution according to the present invention. For example, as shown in FIG. 6, the VSRB may be referred to as a localized virtual short resource block (localized VSRB, LVSRB). Optionally, VSRBs and PSRBs are not in a one-to-one correspondence, that is, consecutive VSRBs are corresponding to inconsecutive PSRBs (that is, distributed PSRBs). FIG. 7 is another schematic diagram of indicating a control channel area in the second control channel area determining solution according to the present invention. For example, as shown in FIG. 7, consecutive virtual short resource blocks are corresponding to inconsecutive physical short resource blocks. In this case, the VSRB is a distributed virtual short resource block (distributed VSRB, DVSRB). It should be noted that the second solution is mainly described by using the VSRB and the PSRB. For implementations of a VSREG and a PSREG, refer to those of the VSRB and the PSRB, while mere a change of the VSRB to the VSREG and a change of the PSRB to the PSREG are required. Details are not described herein again.

It should be noted that an embodiment of the present invention in this solution may be applied to the first signaling and determining of the search space, while mere a change of "the fourth signaling" to "the configuration information of the search space included in the first signaling" and a change of "the control channel area" to "the search space" are required. For example, the configuration information of the search space indicates that the search space occupies the M virtual short resource blocks. For specific content, refer to the descriptions in the solution, and details are not described herein again.

Optionally, the fourth signaling indicates that the control channel area occupies M consecutive virtual short resource blocks or M consecutive virtual SREGs (VSREG, Virtual SREG), and M is a positive integer. Optionally, M can be exactly divided by C, and C is a positive integer. For example, C is equal to 3 or 4. For descriptions of the SRB and the SREG, refer to the foregoing descriptions.

On the terminal device side, before the terminal device determines the control channel area, the method further includes: receiving, by the terminal device, the fourth signaling.

Optionally, that the terminal device determines the control channel area includes: determining, by the terminal device based on the fourth signaling and the mapping relationship between a virtual short resource block and a physical short resource block, M inconsecutive physical short resource blocks occupied by the control channel area, where the mapping relationship between a virtual short resource block and a physical short resource block indicates that the M consecutive virtual short resource blocks are corresponding to the M inconsecutive physical short resource blocks.

Optionally, that the terminal device determines the control channel area includes: determining, by the terminal device based on the fourth signaling and a mapping relationship between a VSREG and a physical SREG (PSREG), M inconsecutive PSREGs occupied by the control channel area, where the mapping relationship between a VSREG and a PSREG indicates that the M consecutive VSREGs are corresponding to the M inconsecutive PSREGs.

Optionally, the fourth signaling may be sent by the network device, and implementation of the solution on the network device side may be: Before the network device sends the downlink control information in the search space, the network device sends the fourth signaling.

Optionally, that the network device determines the control channel area includes: determining, by the network device, that the control channel area occupies M inconsecutive physical short resource blocks; and determining, by the network device based on the mapping relationship between a virtual short resource block and a physical short resource block, that the control channel area occupies the M consecutive virtual short resource blocks.

Optionally, that the network device determines the control channel area includes: determining, by the network device, that the control channel area occupies M inconsecutive PSREGs; and determining, by the network device based on the mapping relationship between a VSREG and a PSREG, that the control channel area occupies the M consecutive VSREGs.

In this solution, the mapping relationship between a virtual short resource block and a physical short resource block may be preconfigured; or after configuration, the network device sends, to the terminal device, signaling indicating the mapping relationship, and then the terminal device receives the signaling indicating the mapping relationship.

This specifically includes the following implementations.

First implementation: The fourth signaling indicates that the control channel area occupies the M consecutive VSRBs. For example, the fourth signaling indicates a startpoint and an endpoint of the M consecutive VSRBs. In this case, the fourth signaling includes B-bit information used to indicate the M consecutive VSRBs, where $B=\lceil \log_2(N_{SRB}(N_{SRB}+1)/2) \rceil$, and $M_{SRB}$ is a quantity of VSRBs included in the available bandwidth. For example, $M_{SRB}=50$, and $B=11$.

Second implementation: The control channel area occupies the M consecutive VSRBs, a startpoint of the M consecutive VSRBs is a VSRB with a smallest VSRB number in the available bandwidth, and the fourth signaling indicates a value of M. In this case, the fourth signaling includes B-bit information used to indicate M, where $B=\lceil \log_2(N_{SRB}) \rceil$. For example, $M_{SRB}=50$, $B=6$, the startpoint is a VSRB whose VSRB number is 0, and the information indicating the value of M is 001001 (that is, M=9). In this case, the control channel area occupies nine consecutive VSRBs whose VSRB numbers are 0 to 8.

Third implementation: The control channel area occupies M VSRBs, including a VSRB whose number is $(S_{SRB}+i) \mod N_{SRB}$, i=0, . . . , M−1, and the fourth signaling indicates a value of M. $S_{SRB}$ is calculated based on a cell identifier (Cell ID, $N_{ID}^{cell}$). For example, $S_{SRB}=N_{ID}^{cell}$, $S_{SRB}=N_{ID}^{cell} \mod N_{SRB}$, or $S_{SRB}=N_{ID}^{cell} \mod N_{SRB}+k$, and k is a positive integer. In this case, the fourth signaling includes B-bit information used to indicate M, where $B=\lceil \log_2(N_{SRB}) \rceil$. For example, $M_{SRB}=50$, $B=6$, $N_{ID}^{cell}=45$, and the information indicating the value of M is 001001 (that is, M=9). In this case, the control channel area occupies nine consecutive VSRBs whose VSRB numbers are 45 to 49 and 0 to 3.

Fourth implementation: The control channel area occupies the M consecutive VSRBs, a startpoint of the M consecutive VSRBs is a VSRB with a smallest VSRB number in the available bandwidth, and the fourth signaling indicates an endpoint of the M consecutive VSRBs. In this case, the fourth signaling includes B-bit information used to indicate M, where $B=\lceil \log_2(M_{SRB}) \rceil$. For example, $M_{VRB}=50$, $B=6$, the startpoint is a VSRB whose number is 0, and information indicating the endpoint is 001001 (that is, M=9). In this case, the control channel area occupies 10 consecutive VSRBs whose VSRB numbers are 0 to 9.

Fifth implementation: The fourth signaling indicates that the control channel area occupies N consecutive VSRBGs (VSRB Group), one VSRBG includes P consecutive VSRBs, P is a positive integer, and M=N×P. For example, P is 3 or 4. For example, the fourth signaling indicates a startpoint and an endpoint of the N consecutive VSRBGs. In this case, the fourth signaling includes B-bit information used to indicate the N consecutive VSRBGs, where $B=\lceil \log_2(N_{SRBG}(N_{SRBG}+1)/2) \rceil$, and $N_{SRBG}$ is a quantity of VSRBGs included in the available bandwidth. For example, $N_{SRB}=50$, $N_{SRBG}=16$, and B=8.

Sixth implementation: The control channel area occupies N consecutive VSRBGs, a startpoint of the M consecutive VSRBs is a VSRB with a smallest VSRB number in the available bandwidth, and the fourth signaling indicates a value of N. M=N×P. For example, P is 3 or 4. In this case, the fourth signaling includes B-bit information used to indicate N, where $B=\lceil \log_2(N_{SRBG}) \rceil$. For example, $N_{SRBG}=16$, B=4, P=3, the startpoint is a VSRB whose VSRB number is 0, and information indicating the value of N is 0011 (that is, N=3), and therefore M=9. In this case, the control channel area occupies nine consecutive VSRBs whose VSRB numbers are 0 to 8.

In this implementation, overheads of the fourth signaling are relatively low, and in particular, the overheads are further reduced after the VSRBG is used. If the network device cannot obtain accurate channel status information, the DVSRB may be used to obtain a frequency domain diversity gain.

6. Third Control Channel Area Determining Solution

The first signaling indicates a CCE resource, and before the terminal device determines the control channel area, the method further includes: receiving, by the terminal device, fifth signaling, where the fifth signaling indicates that the control channel area occupies Z consecutive CCEs, and Z is a positive integer.

It should be noted that an embodiment of the present invention in this solution may be applied to the first signaling and determining of the search space, while mere a change of "the fifth signaling" to "the configuration information of the search space included in the first signaling" and a change of "the control channel area" to "the search space" are required. For example, the configuration information of the search space indicates that the search space occupies the Z consecutive CCEs. For specific content, refer to the descriptions in the solution, and details are not described herein again.

That the terminal device determines the control channel area includes: determining, by the terminal device, the control channel area based on the fifth signaling.

Optionally, the fifth signaling may be sent by the network device, and specific implementation on the network device side is: Before the network device sends the downlink control information in the search space, the network device sends the fifth signaling, and the fifth signaling indicates that the control channel area occupies the Z consecutive CCEs.

This means that the terminal device determines, based on the received fifth signaling, that the control channel area occupies the Z consecutive CCEs.

Optionally, the fifth signaling indicates a startpoint and an endpoint of the Z consecutive CCEs. In this case, the fifth signaling includes B-bit information used to indicate the Z consecutive CCEs, where $B=\lceil \log_2(N_{CCE}(N_{CCE}+1)/2) \rceil$.

Optionally, the startpoint of the Z consecutive CCEs is a CCE 0, and the fifth signaling indicates a value of Z, or the fifth signaling indicates the endpoint of the Z consecutive CCEs.

7. Fourth Control Channel Area Determining Solution

The terminal device determines that the control channel area occupies M SRBGs (SRB Group), and M is a positive integer. Optionally, the terminal device determines, based on received sixth signaling, that the control channel area occupies the M SRBGs. In this method, signaling overheads are reduced through indication of the SRBG.

It should be noted that this solution is mainly described by using a VSRB and a PSRB, but is also applicable to a VSREG and a PSREG. For implementations of the VSREG and the PSREG, refer to those of the VSRB and the PSRB, while mere a change of the VSRB to the VSREG and a change of the PSRB to the PSREG are required. Details are not described herein again.

It should be noted that an embodiment of the present invention in this solution may be applied to the first signaling and determining of the search space, while mere a change of "the sixth signaling" to "the configuration information of the search space included in the first signaling" and a change of "the control channel area" to "the search space" are required. For example, the configuration information of the search space indicates that the search space occupies the M SRBGs. For specific content, refer to the descriptions in the solution, and details are not described herein again.

Optionally, one SRBG includes P SRBs, and P is positive integer. Two SRBG configuration solutions are as follows.

First SRBG configuration solution: One SRBG includes P SRBs, and the P SRBs are consecutively distributed. P is a positive integer, for example, 1, 2, 3, or 4. Optionally, M×P can be exactly divided by C, and C is a positive integer. For example, C=3 or 4. For example, P=4, and C=3. In this case, M needs to be exactly divided by 3, and for example, is 3, 6, or 9. For example, P=3, and C=3. In this case, M can be any positive integer.

Figure 8:
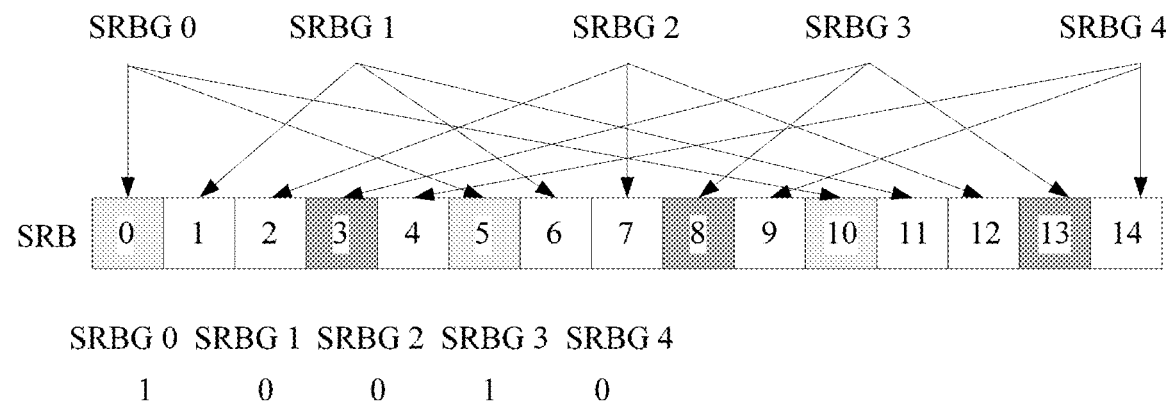
FIG. 8 is a schematic diagram of indicating a control channel area in a fourth control channel area determining solution according to the present invention.

Second SRBG configuration solution: One SRBG includes P SRBs, and the P SRBs are distributed non-consecutively or at equal intervals. P is a positive integer, for example, 3, 6, 9, or 12. FIG. 8 is a schematic diagram of indicating a control channel area in the fourth control channel area determining solution according to the present invention. As shown in FIG. 8, the available bandwidth includes five SRBGs, and each SRBG includes three SRBs distributed at equal intervals. In this method, three SRBs in one CCE are non-consecutively distributed, so that a frequency domain diversity gain can be obtained.

Optionally, four indication methods of the sixth signaling are as follows.

First indication method: The sixth signaling indicates that the control channel area occupies M SRBGs (SRB Group), and M is a positive integer. The sixth signaling includes $N_{SRBG}$-bit information used to indicate the M SRBGs, and one bit is corresponding to one SRBG, that is, one bit is used to indicate an occupation status of one SRBG, and $$N_{SRBG} = \lfloor \frac{N_{SRB}}{P} \rfloor \text{ or } \lceil \frac{N_{SRB}}{P} \rceil.$$

For example, the available bandwidth includes 50 SRBs, and one SRBG includes three SRBs. In this case, the available bandwidth includes 16 or 17 (in this case, one of the SRBGs includes two SRBs) SRBGs, and therefore 16 bits or 17 bits are required to indicate a frequency domain resource occupied by the control channel area. As shown in FIG. 8, the available bandwidth includes five SRBGs, and each SRBG includes three SRBs distributed at equal intervals. The sixth signaling includes five bits, and both a first bit and a fourth bit are "1". It indicates that the control channel area occupies an SRBG 0 and an SRBG 3. Therefore, the terminal device determines that the control channel area occupies SRBs 0, 3, 5, 8, 10, and 13.

Second indication method: The control channel area occupies M consecutive SRBGs, and the sixth signaling indicates a startpoint and an endpoint of the M consecutive SRBGs. In this case, the sixth signaling includes B-bit information used to indicate the M consecutive SRBGs, where $B=\lceil \log_2 (N_{SRBG}(N_{SRBG}+1)/2 \rceil$, and $N_{SRBG}$ is a quantity of SRBGs included in the available bandwidth.

Figure 9:
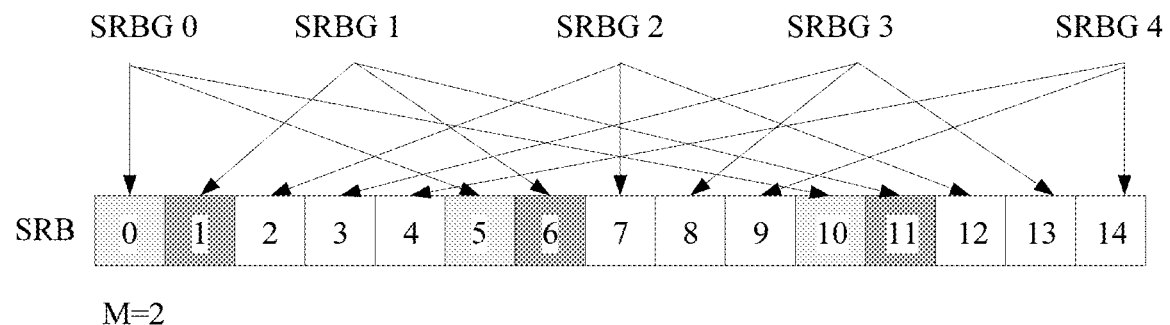
FIG. 9 is another schematic diagram of indicating a control channel area in a fourth control channel area determining solution according to the present invention.

Third indication method: The control channel area occupies M consecutive SRBGs, and the sixth signaling indicates a first SRBG (SRB Group) occupied by the control channel area, that is, the sixth signaling indicates a location of the first SRBG in the M SRBGs. The sixth signaling includes $\lceil \log_2 M \rceil$-bit information used to indicate the first SRBG in the M SRBGs. For example, the available bandwidth includes 16 SRBGs, and in this case, four bits are required to indicate the location of the first SRBG. Optionally, the control channel area is the search space. In this case, the terminal device may determine M based on the size of the search space. $M=C*L*N_{ctl}$, C is a quantity of SRBs occupied by one CCE, L is an aggregation level, and $N_{ctl}$ is a quantity of candidate control channels. For example, C=3, L=1, and $N_{ctl}$=2. In this case, M is equal to 6. FIG. 9 is another schematic diagram of indicating a control channel area in the fourth control channel area determining solution according to the present invention. As shown in FIG. 9, when the second SRBG configuration solution is used, the control channel area occupies SRBs 0, 1, 5, 6, 10, and 11.

Fourth indication method: The control channel area occupies M consecutive SRBGs, a startpoint of the M consecutive SRBGs is an SRBG with a smallest SRBG number in the available bandwidth, and the sixth signaling indicates a value of M. In this case, the sixth signaling includes B-bit information used to indicate M, where $B=\lceil \log_2(N_{SRBG}) \rceil$.

It should be noted that the first SRBG configuration solution or the second SRBG configuration solution is used for the SRBGs described in the four indication methods of the sixth signaling.

Figure 10:
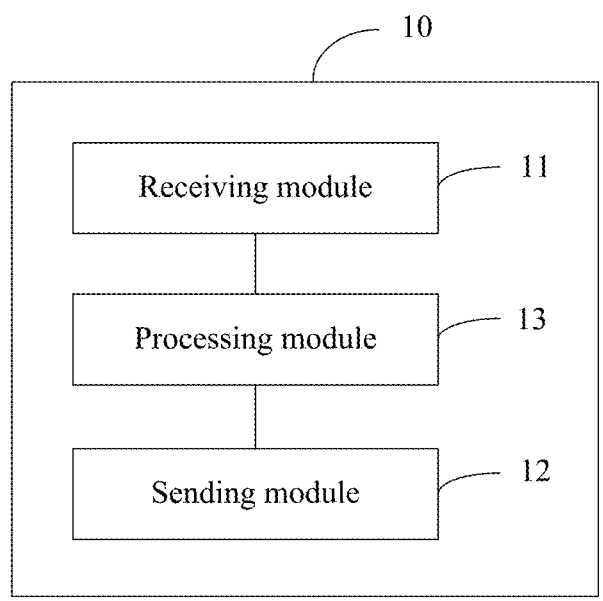
FIG. 10 is a schematic structural diagram of Embodiment 1 of a terminal device according to the present invention.

FIG. 10 is a schematic structural diagram of Embodiment 1 of a terminal device according to the present invention. The terminal device may be configured to perform the technical solution of the terminal device in any one of the foregoing solutions. As shown in FIG. 10, the terminal device 10 includes a receiving module 11, a sending module 12, and a processing module 13.

The receiving module 11 is configured to receive first signaling, where the first signaling includes configuration information of search space.

The processing module 13 is configured to determine, based on the configuration information of the search space, a frequency domain resource or a control channel element CCE resource occupied by the search space.

The processing module 13 is further configured to detect downlink control information in the search space.

Optionally, the processing module 13 is further configured to determine a control channel area.

Optionally, the search space is located in the control channel area.

Optionally, the configuration information of the search space indicates an aggregation level L and a search space startpoint identifier Y, and the processing module 13 is specifically configured to:

determine, based on the configuration information of the search space, that the search space includes a CCE whose number is $L*\{(Y+m)\mod \lfloor N_{CCE}/L \rfloor\}+i$, where i=0, ..., L−1, m=0, ..., $M^{(L)}$−1, $M^{(L)}$ is a quantity of candidate downlink control channels included in search space whose aggregation level is L, and $N_{CCE}$ represents a total quantity of available CCEs in a transmission time interval occupied by the search space.

Optionally, the receiving module 11 is further configured to receive second signaling, where the second signaling indicates a resource occupied by the control channel area, the second signaling includes $N_{CCEG}$ information fields, an $i^{th}$ information field in the $N_{CCEG}$ information fields indicates that H CCEs in a control channel element group CCEG i−1 are configured for the control channel area, i is a positive integer not greater than $N_{CCEG}$ and the CCEG i−1 includes G CCEs, G is a positive integer, and H is a nonnegative integer not greater than G.

Optionally, G indicated in the second signaling received by the receiving module 11 is equal to 8, H is 0, 2, 4, or 8, and a quantity of bits in the $i^{th}$ information field is 2.

Optionally, the configuration information that is of the search space and that is received by the receiving module 11 indicates that the search space is located on a CCEG j, or the configuration information of the search space indicates that a startpoint of the search space is a CCEG j, and j is a nonnegative integer less than $N_{CCEG}$.

Optionally, the first signaling received by the receiving module 11 further includes configuration information of the control channel area, where the configuration information of the search space indicates that a startpoint of the search space is a CCE i, and the configuration information of the control channel area indicates that the control channel area occupies X consecutive CCEs, X is a positive integer, and i is a nonnegative integer less than X.

The processing module 13 is specifically configured to determine the control channel area based on the configuration information of the control channel area.

Optionally, the first signaling received by the receiving module 11 further includes configuration information of the control channel area, where the configuration information of the control channel area indicates that the control channel area occupies E consecutive CCEGs, and the configuration information of the search space indicates that a startpoint of the search space is a CCEG i, E is a positive integer, and i is a nonnegative integer less than E.

The processing module 13 is specifically configured to determine the control channel area based on the configuration information of the control channel area.

Optionally, the receiving module 11 is further configured to receive third signaling, where the third signaling indicates that the control channel area occupies N short resource blocks, each short resource block occupies 12 subcarriers in frequency domain, and occupies one or two symbols in time domain, and N can be exactly divided by 3 or 4.

The processing module is further specifically configured to determine the control channel area based on the third signaling.

Optionally, the receiving module 11 is further configured to receive fourth signaling, where the fourth signaling indicates that the control channel area occupies M consecutive virtual short resource blocks, and M is a positive integer that can be exactly divided by 3 or 4.

The processing module 13 is further specifically configured to determine, based on the fourth signaling and a mapping relationship between a virtual short resource block and a physical short resource block, M inconsecutive physical short resource blocks occupied by the control channel area, where the mapping relationship between a virtual short resource block and a physical short resource block indicates that the M consecutive virtual short resource blocks are corresponding to the M inconsecutive physical short resource blocks.

Optionally, the receiving module 11 is further configured to receive fifth signaling, where the fifth signaling indicates that the control channel area occupies Z consecutive CCEs, and Z is a positive integer.

The processing module 13 is further specifically configured to determine the control channel area based on the fifth signaling.

It should be noted that in this embodiment, the receiving module 11 may also be referred to as a receiving unit 11, the sending module 12 may also be referred to as a sending unit 12, and the processing module 13 may also be referred to as a processing unit 13. In addition, the receiving module 11 and the sending module 12 may be combined into a transceiver module.

The terminal device provided in this embodiment is configured to perform the technical solution of the terminal device in any one of the foregoing method embodiments, and implementation principles and technical effects of the terminal device are similar to those of the method embodiments. Details are not described herein again.

Figure 11:
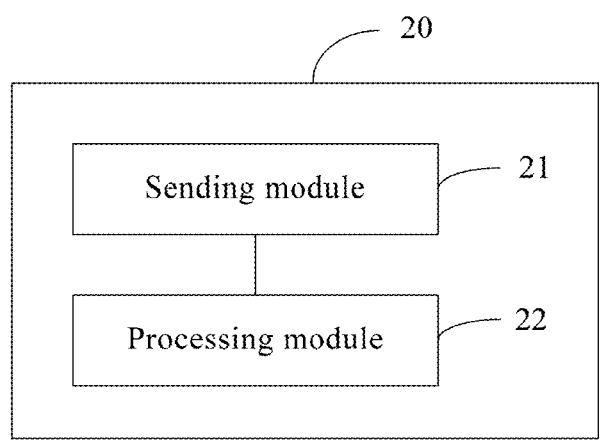
FIG. 11 is a schematic structural diagram of Embodiment 1 of a network device according to the present invention.

FIG. 11 is a schematic structural diagram of Embodiment 1 of a network device according to the present invention. The network device may be configured to perform the technical solution of the network device in any one of the foregoing embodiments. As shown in FIG. 11, the network device 20 includes a sending module 21 and a processing module 22.

The processing module 22 is configured to determine search space.

The sending module 21 is configured to:

send a first instruction, where the first signaling includes configuration information of search space, and the configuration information is used to indicate a frequency domain resource or a control channel element CCE resource; and send downlink control information in the search space.

Optionally, the processing module 22 is further configured to determine a control channel area, and the search space is located in the control channel area.

Optionally, the configuration information of the search space indicates an aggregation level L and a search space startpoint identifier Y, and the processing module 22 is specifically configured to:

determine that the search space includes a CCE whose number is $L*\{(Y+m) \bmod \lfloor N_{CCE}/L \rfloor\}+i$, where $i=0, \ldots, L-1, m=0, \ldots, M^{(L)}-1$, $M^{(L)}$ is a quantity of candidate downlink control channels included in search space whose aggregation level is L, and $N_{CCE}$ represents a total quantity of available CCEs in a transmission time interval occupied by the search space.

Optionally, the sending module 21 is further configured to send second signaling, where the second signaling indicates a resource occupied by the control channel area, the second signaling includes $N_{CCEG}$ information fields, an $i^{th}$ information field in the $N_{CCEG}$ information fields indicates that H CCEs in a control channel element group CCEG i−1 are configured for the control channel area, i is a positive integer not greater than $N_{CCEG}$ and the CCEG i−1 includes G CCEs, G is a positive integer, and H is a nonnegative integer not greater than G.

Optionally, G indicated in the second signaling sent by the sending module 21 is equal to 8, H is 0, 2, 4, or 8, and a quantity of bits in the $i^{th}$ information field is 2.

Optionally, the configuration information that is of the search space and that is sent by the sending module 21 indicates that the search space is located on a CCEG j, or the configuration information of the search space indicates that a startpoint of the search space is a CCEG j, and j is a nonnegative integer less than $N_{CCEG}$.

Optionally, the first signaling sent by the sending module 21 further includes configuration information of the control channel area, where the configuration information of the control channel area indicates that the control channel area occupies E consecutive CCEGs, and the configuration information of the search space indicates that a startpoint of the search space is a CCEG i, E is a positive integer, and i is a nonnegative integer less than E.

Optionally, the sending module 21 is further configured to send third signaling, where the third signaling indicates that the control channel area occupies N short resource blocks, each short resource block occupies 12 subcarriers in frequency domain, and occupies one or two symbols in time domain, and N can be exactly divided by 3 or 4.

Optionally, the sending module 21 is further configured to send fourth signaling, where the fourth signaling indicates that the control channel area occupies M consecutive virtual short resource blocks, and M is a positive integer that can be exactly divided by 3 or 4.

The M consecutive virtual short resource blocks are corresponding to M inconsecutive physical short resource blocks.

Optionally, the sending module 21 is further configured to send fifth signaling, where the fifth signaling indicates that the control channel area occupies Z consecutive CCEs, and Z is a positive integer.

It should be noted that the network device in this embodiment may further include a receiving module. In addition, the sending module 21 may also be referred to as a sending unit 21, and the processing module 22 may also be referred to as a processing unit 22. In addition, the receiving module and the sending module 21 may be combined into a transceiver module.

The network device provided in this embodiment is configured to perform the technical solution of the network device in any one of the foregoing method embodiments, and implementation principles and technical effects of the network device are similar to those of the method embodiments. Details are not described herein again.

Figure 12:
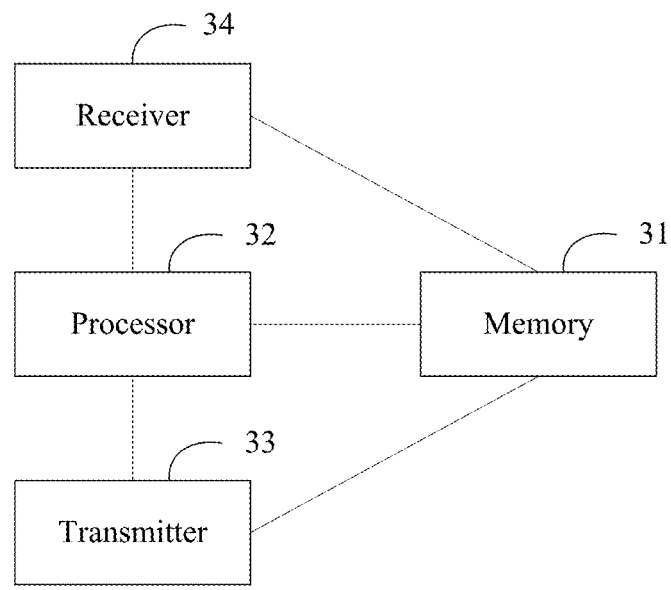
FIG. 12 is a schematic structural diagram of Embodiment 2 of a terminal device according to the present invention.

FIG. 12 is a schematic structural diagram of Embodiment 2 of a terminal device according to the present invention. As shown in FIG. 12, the terminal device may include a processor 32, a transmitter 33, and a receiver 34, and may further include a memory 31.

The receiver 34 is configured to receive first signaling, where the first signaling includes configuration information of search space.

The processor 32 is configured to determine, based on the configuration information of the search space, a frequency domain resource or a control channel element CCE resource occupied by the search space.

The processor 32 is further configured to detect downlink control information in the search space.

Optionally, the processor 32 is further configured to determine a control channel area, and the search space is located in the control channel area.

Optionally, the configuration information of the search space indicates an aggregation level L and a search space startpoint identifier Y, and the processor 32 is specifically configured to:

determine, based on the configuration information of the search space, that the search space includes a CCE whose number is $L*\{(Y+m) \bmod \lfloor N_{CCE}/L \rfloor\}+i$, where $i=0, \ldots, L-1, m=0, \ldots, M^{(L)}-1$, $M^{(L)}$ is a quantity of candidate downlink control channels included in search space whose aggregation level is L, and $N_{CCE}$ represents a total quantity of available CCEs in a transmission time interval occupied by the search space.

Optionally, the receiver 34 is further configured to receive second signaling, where the second signaling indicates a resource occupied by the control channel area, the second signaling includes $N_{CCEG}$ information fields, an $i^{th}$ information field in the $N_{CCEG}$ information fields indicates that H CCEs in a control channel element group CCEG i−1 are configured for the control channel area, i is a positive integer not greater than $N_{CCEG}$ and the CCEG i−1 includes G CCEs, G is a positive integer, and H is a nonnegative integer not greater than G.

Optionally, G indicated in the second signaling received by the receiver 34 is equal to 8, H is 0, 2, 4, or 8, and a quantity of bits in the $i^{th}$ information field is 2.

Optionally, the configuration information that is of the search space and that is received by the receiver 34 indicates that the search space is located on a CCEG j, or the configuration information of the search space indicates that a startpoint of the search space is a CCEG j, and j is a nonnegative integer less than $N_{CCEG}$.

Optionally, the first signaling received by the receiver 34 further includes configuration information of the control channel area, where the configuration information of the search space indicates that a startpoint of the search space is a CCE i, and the configuration information of the control channel area indicates that the control channel area occupies X consecutive CCEs, X is a positive integer, and i is a nonnegative integer less than X.

The processor 32 is specifically configured to determine the control channel area based on the configuration information of the control channel area.

Optionally, the first signaling received by the receiver 34 further includes configuration information of the control channel area, where the configuration information of the control channel area indicates that the control channel area occupies E consecutive CCEGs, and the configuration information of the search space indicates that a startpoint of the search space is a CCEG i, E is a positive integer, and i is a nonnegative integer less than E.

The processor 32 is specifically configured to determine the control channel area based on the configuration information of the control channel area.

Optionally, the receiver 34 is further configured to receive third signaling, where the third signaling indicates that the control channel area occupies N short resource blocks, each short resource block occupies 12 subcarriers in frequency domain, and occupies one or two symbols in time domain, and N can be exactly divided by 3 or 4.

The processor is further specifically configured to determine the control channel area based on the third signaling.

Optionally, the receiver 34 is further configured to receive fourth signaling, where the fourth signaling indicates that the control channel area occupies M consecutive virtual short resource blocks, and M is a positive integer that can be exactly divided by 3 or 4.

The processor 32 is further specifically configured to determine, based on the fourth signaling and a mapping relationship between a virtual short resource block and a physical short resource block, M inconsecutive physical short resource blocks occupied by the control channel area, where the mapping relationship between a virtual short resource block and a physical short resource block indicates that the M consecutive virtual short resource blocks are corresponding to the M inconsecutive physical short resource blocks.

Optionally, the receiver 34 is further configured to receive fifth signaling, where the fifth signaling indicates that the control channel area occupies Z consecutive CCEs, and Z is a positive integer.

The processor 32 is further specifically configured to determine the control channel area based on the fifth signaling.

It may be understood that FIG. 12 merely shows a simplified design of the terminal device. In actual application, the terminal device may include any quantity of transmitters, receivers, processors, controllers, memories, and the like, and all terminal devices that can implement the present invention fall within the protection scope of the present invention. Without loss of generality, the transmitter and the receiver may be combined into a transceiver.

The terminal device provided in this embodiment is configured to perform the technical solution in any one of the foregoing method embodiments, and implementation principles and technical effects of the terminal device are similar to those of the method embodiments. Details are not described herein again.

Figure 13:
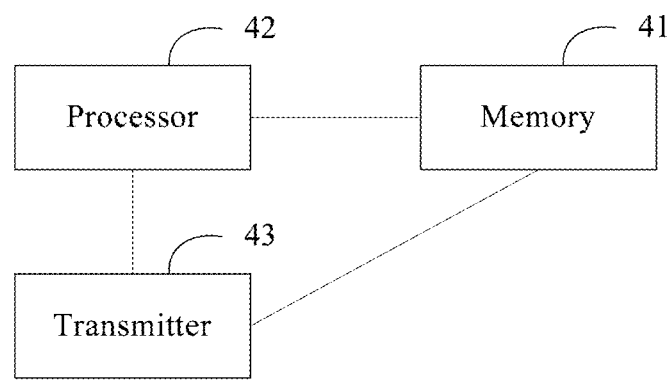
FIG. 13 is a schematic structural diagram of Embodiment 2 of a network device according to the present invention.

FIG. 13 is a schematic structural diagram of Embodiment 2 of a network device according to the present invention. As shown in FIG. 13, the network device includes a processor 42 and a transmitter 43. In addition, the network device may further include a memory 41.

The processor 42 is configured to determine search space.
The transmitter 43 is configured to:
send a first instruction, where the first signaling includes configuration information of search space, and the configuration information is used to indicate a frequency domain resource or a control channel element CCE resource; and
send downlink control information in the search space.

Optionally, the processor 42 is further configured to determine a control channel area, and the search space is located in the control channel area.

Optionally, the configuration information of the search space indicates an aggregation level L and a search space startpoint identifier Y, and the processor 42 is specifically configured to:
determine that the search space includes a CCE whose number is $L*\{(Y+m) \bmod \lfloor N_{CCE}/L \rfloor\}+i$, where $i=0, \ldots, L-1, m=0, \ldots, M^{(L)}-1$, $M^{(L)}$ is a quantity of candidate downlink control channels included in search space whose aggregation level is L, and $N_{CCE}$ represents a total quantity of available CCEs in a transmission time interval occupied by the search space.

Optionally, the transmitter 43 is further configured to send second signaling, where the second signaling indicates a resource occupied by the control channel area, the second signaling includes $N_{CCEG}$ information fields, an $i^{th}$ information field in the $N_{CCEG}$ information fields indicates that H CCEs in a control channel element group CCEG i−1 are configured for the control channel area, i is a positive integer not greater than $N_{CCEG}$ and the CCEG i−1 includes G CCEs, G is a positive integer, and H is a nonnegative integer not greater than G.

Optionally, G indicated in the second signaling sent by the transmitter 43 is equal to 8, H is 0, 2, 4, or 8, and a quantity of bits in the $i^{th}$ information field is 2.

Optionally, the configuration information that is of the search space and that is sent by the transmitter 43 indicates that the search space is located on a CCEG j, or the configuration information of the search space indicates that a startpoint of the search space is a CCEG j, and j is a nonnegative integer less than $N_{CCEG}$.

Optionally, the first signaling received by the transmitter 43 further includes configuration information of the control channel area, where the configuration information of the control channel area indicates that the control channel area occupies E consecutive CCEGs, and the configuration information of the search space indicates that a startpoint of the search space is a CCEG i, E is a positive integer, and i is a nonnegative integer less than E.

Optionally, the transmitter 43 is further configured to send third signaling, where the third signaling indicates that the control channel area occupies N short resource blocks, each short resource block occupies 12 subcarriers in frequency domain, and occupies one or two symbols in time domain, and N can be exactly divided by 3 or 4.

Optionally, the transmitter 43 is further configured to send fourth signaling, where the fourth signaling indicates that the control channel area occupies M consecutive virtual short resource blocks, and M is a positive integer that can be exactly divided by 3 or 4.

The M consecutive virtual short resource blocks are corresponding to M inconsecutive physical short resource blocks.

Optionally, the transmitter 43 is further configured to send fifth signaling, where the fifth signaling indicates that the control channel area occupies Z consecutive CCEs, and Z is a positive integer.

It may be understood that FIG. 13 merely shows a simplified design of the network device. In actual application, the network device may include any quantity of receivers, transmitters, processors, controllers, memories, and the like, and all network devices that can implement the present invention fall within the protection scope of the present invention. Without loss of generality, the transmitter and the receiver may be combined into a transceiver.

The network device provided in this embodiment is configured to perform the technical solution in any one of the foregoing method embodiments, and implementation principles and technical effects of the network device are similar to those of the method embodiments. Details are not described herein again.

It should be understood that in the foregoing terminal device and network device embodiments, the processor may be a central processing unit (CPU), or may be another general-purpose processor, a digital signal processor (DSP), an application-specific integrated circuit (ASIC), or the like. The general purpose processor may be a microprocessor, or the processor may be any conventional processor or the like. The steps of the methods disclosed with reference to the embodiments of the present invention may be directly performed by a hardware processor, or may be performed by using a combination of hardware in the processor and a software module.

Persons of ordinary skill in the art may understand that all or some of the steps of the method embodiments may be implemented by a program instructing relevant hardware. The program may be stored in a computer-readable storage medium. When the program is executed, the steps of the methods in the embodiments are performed. The storage medium includes: a read-only memory (ROM), a RAM, a flash memory, a hard disk, a solid state disk, a magnetic tape, a floppy disk, an optical disc, and any combination thereof.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A downlink control information detection method comprising:
    receiving, by a terminal device, first signaling comprising configuration information of search space located within a control channel area;
    determining, by the terminal device based on the configuration information of the search space, a frequency domain resource or a control channel element (CCE) resource occupied by the search space;
    receiving, by the terminal device, third signaling indicating that the control channel area occupies N short resource blocks,
        wherein N is evenly divided by 3, and
        wherein each short resource block occupies 12 subcarriers in a frequency domain and one or two symbols in a time domain; and
    detecting, by the terminal device, downlink control information in the search space.

2. The method according to claim 1, wherein the configuration information of the search space indicates an aggregation level and a search space start point identifier.

3. The method according to claim 1, wherein before determining the control channel area, the method further comprises:
    receiving, by the terminal device, second signaling indicating a resource occupied by the control channel area, wherein the second signaling comprises $N_{CCEG}$ information fields, an $i^{th}$ information field in the $N_{CCEG}$ information fields indicates that H CCEs, in a control channel element group (CCEG), i−1 of the CCEs are configured for the control channel area,
        wherein i is a positive integer not greater than $N_{CCEG}$ and the i−1 CCEs of the CCEG consist of G CCEs, and
        wherein G is a positive integer, and H is equal to G.

4. A downlink control information sending method comprising:
    determining, by a network device, a control channel area, wherein search space is located in the control channel area;
    sending, by the network device, a first signaling comprising configuration information of the search space located within the control channel area,
        wherein the configuration information indicates a frequency domain resource or a control channel element (CCE) resource occupied by the search space; and
    sending, by the network device, third signaling indicating that the control channel area occupies N short resource blocks,
        wherein N can be exactly divided by 3, and
        wherein each short resource block occupies 12 subcarriers in frequency domain and occupies one or two symbols in time domain; and
    sending, by the network device, downlink control information in the search space.

5. The method according to claim 4, wherein the configuration information of the search space indicates an aggregation level and a search space start point identifier.

6. The method according to claim 4, further comprising:
    sending, by the network device, second signaling indicating a resource occupied by the control channel area,
        wherein the second signaling comprises $N_{CCEG}$ information fields, an $i^{th}$ information field in the $N_{CCEG}$ information fields indicates that H CCEs, in a control channel element group (CCEG), i−1 of the CCEs are configured for the control channel area,
        wherein i is a positive integer not greater than $N_{CCEG}$ the i−1 CCEs of the CCEG consist of G CCEs, and
        wherein G is a positive integer, and H is equal to G.

7. A terminal device comprising:
    a processor;
    a receiver configured to cooperate with the processor to receive first signaling comprising configuration information of search space located within a control channel area; and
    the processor configured to
        determine, based on the configuration information of the search space, a frequency domain resource or a control channel element (CCE) resource occupied by the search space; and
        receiving third signaling indicating that the control channel area occupies N short resource blocks,
            wherein N is evenly divided by 3, and
            wherein each short resource block occupies 12 subcarriers in a frequency domain and one or two symbols in a time domain; and
        detecting downlink control information in the search space.

8. The terminal device according to claim 7, wherein the configuration information of the search space indicates an aggregation level and a search space start point identifier.

9. The terminal device according to claim 7, wherein the receiver is further configured to cooperate with the processor to receive second signaling indicating a resource occupied by the control channel area, wherein the second signaling comprises $N_{CCEG}$ information fields, an $i^{th}$ information field in the $N_{CCEG}$ information fields indicates that H CCEs, in a control channel element group (CCEG), i−1 of the CCEs are configured for the control channel area, wherein i is a positive integer not greater than $N_{CCEG}$ and the i−1 CCEs of the CCEG consist of G CCEs, and wherein G is a positive integer, and H is equal to G.

10. A network device comprising:

a processor;

a transmitter; and the processor configured to determine a control channel area, wherein search space is located in the control channel area, and the processor is further configured to cooperate with the transmitter to send first signaling comprising configuration information of the search space located within the control channel area, wherein the configuration information indicates a frequency domain resource or a control channel element (CCE) resource occupied by the search space;

send third signaling indicating that the control channel area occupies N short resource blocks, wherein N can be exactly divided by 3, and wherein each short resource block occupies 12 subcarriers in frequency domain and occupies one or two symbols in time domain; and send downlink control information in the search space.

11. The network device according to claim 10, wherein the configuration information of the search space indicates an aggregation level and a search space start point identifier.

12. The network device according to claim 10, wherein the processor is further configured to cooperate with the transmitter to send second signaling indicating a resource occupied by the control channel area, wherein the second signaling comprises $N_{CCEG}$ information CCEG fields, an $i^{th}$ information field in the $N_{CCEG}$ information fields indicates that H CCEs, in a control channel element group (CCEG), i−1 of the CCEs are configured for the control channel area, wherein i is a positive integer not greater than $N_{CCEG}$ and the i−1 CCEs of the CCEG consist of G CCEs, and wherein G is a positive integer, and H is equal to G.

* * * * *